(12) United States Patent
Frazier et al.

(10) Patent No.: US 7,409,138 B1
(45) Date of Patent: Aug. 5, 2008

(54) FIBER OPTIC LOCAL CONVERGENCE POINTS FOR MULTIPLE DWELLING UNITS

(75) Inventors: Brent Michael Frazier, Haslett, TX (US); Danny McGranahan, Ft. Worth, TX (US); Raymond Glenn Jay, Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/716,824

(22) Filed: Mar. 12, 2007

(51) Int. Cl.
*G02B 6/00* (2006.01)
(52) U.S. Cl. .................................................. 385/135
(58) Field of Classification Search ............... None
See application file for complete search history.

(56) References Cited

U.S. PATENT DOCUMENTS

| | | | |
|---|---|---|---|
| 5,260,957 A | 11/1993 | Hakimi et al. | 372/39 |
| 5,881,200 A | 3/1999 | Burt | 385/142 |
| 6,535,579 B1 | 3/2003 | Blake et al. | 379/22.06 |
| 6,577,801 B2 | 6/2003 | Broderick et al. | 385/125 |
| 6,710,366 B1 | 3/2004 | Lee et al. | 257/14 |
| 6,795,552 B1 | 9/2004 | Stanush et al. | 379/413.01 |
| 6,815,612 B2 | 11/2004 | Bloodworth et al. | 174/50 |
| 6,968,107 B2 | 11/2005 | Belardi et al. | 385/127 |
| 7,054,513 B2 | 5/2006 | Herz et al. | 385/12 |
| 2004/0228598 A1* | 11/2004 | Allen et al. | 385/135 |
| 2005/0021392 A1 | 1/2005 | English et al. | 705/12 |
| 2005/0129379 A1* | 6/2005 | Reagan et al. | 385/135 |
| 2005/0213921 A1 | 9/2005 | Mertesdorf et al. | 385/135 |
| 2006/0263029 A1 | 11/2006 | Mudd et al. | 385/135 |

FOREIGN PATENT DOCUMENTS

| | | |
|---|---|---|
| JP | 62-27312 | 2/1987 |
| WO | 2005/050277 A2 | 6/2005 |
| WO | 2005/088373 A1 | 9/2005 |
| WO | 2006/050505 A1 | 5/2006 |
| WO | 2006/135524 A2 | 12/2006 |

OTHER PUBLICATIONS

Emerson product sheet, "NetSpan™ Fiber Distribution Hub Fiber Cross-Connect Enclosure", "Outside Plant for Business Continuity", © 2006 Emerson Network Power Energy Systems, North America, www.EmersonNetworkPower.com/Energy Systems.Com, 2 pages.

(Continued)

*Primary Examiner*—Rodney Bovernick
*Assistant Examiner*—Mike Stahl

(57) ABSTRACT

There are provided fiber optic local convergence points ("LCPs") adapted for use with multiple dwelling units ("MDUs") that facilitate relatively easy installation and/or optical connectivity to a relatively large number of subscribers. The LCP includes a housing comprising an access cover for separating the subscriber portion from the provider portions. A splitter module of the LCP may be joined to the interior side of the access cover or may be joined to the housing opposite the access cover. The LCP may also include a splice tray assembly and/or an input receptacle to facilitate convenient installation of the provider cable. The LCP further comprises a plurality of receptacles for selective optical connection of a plurality of subscriber drop fibers/cables.

14 Claims, 18 Drawing Sheets

OTHER PUBLICATIONS

Hitachi Cable Review No. 24 "Low-low Holey Fiber", Aug. 2005, 5 pages.

Draka Comteq / Optical Fibre, Issue Date: Aug. 2006, Supercedes: -/-, "BendBright $^{xs}$ Single Mode Optical Fibre, Enhanced low macrobending sensitive, low water peak fibre, Product Type: G.652D, Coating Type: ColorLock™ and Natural", www.drakafibre.com | www.draka.com, 2 pages.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Corning Cable Systems LLC, Product Information Sheet, "OptiTect™ Premier Local Convergence Cabinet, An Evolant® Solutions Product", Sep. 2006, 6 pages.

\* cited by examiner

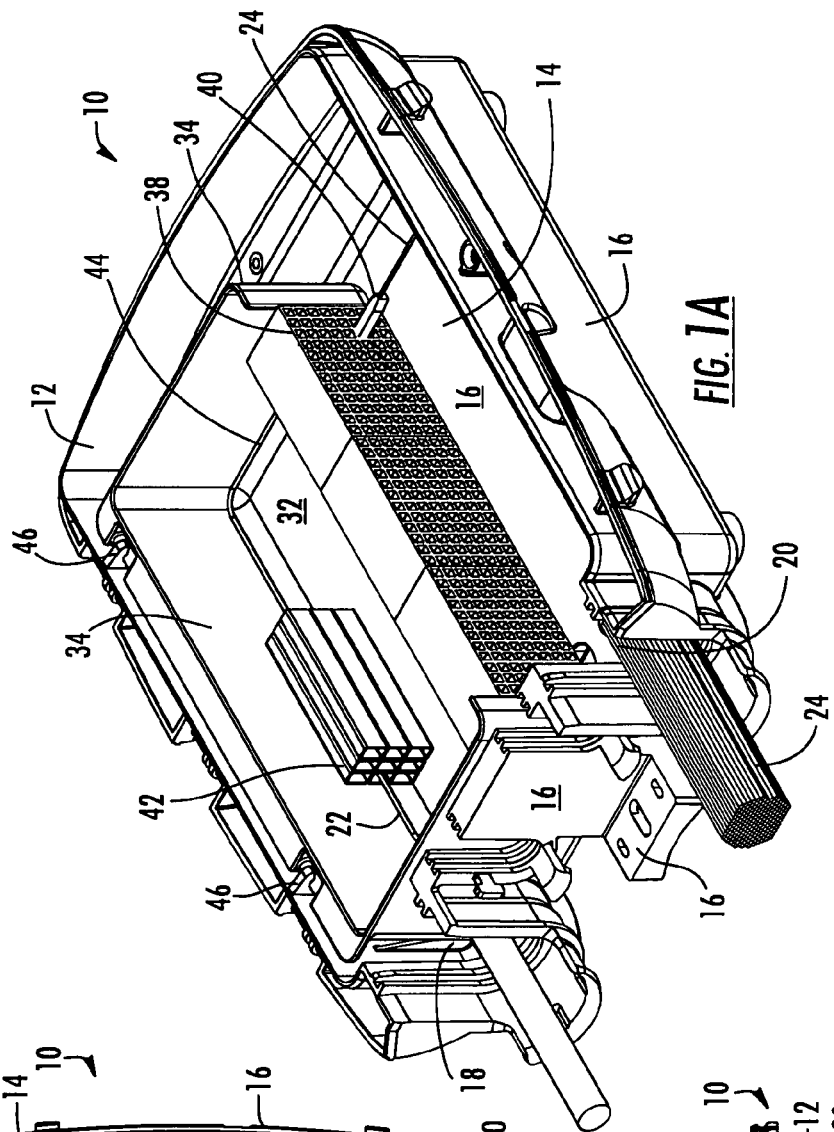
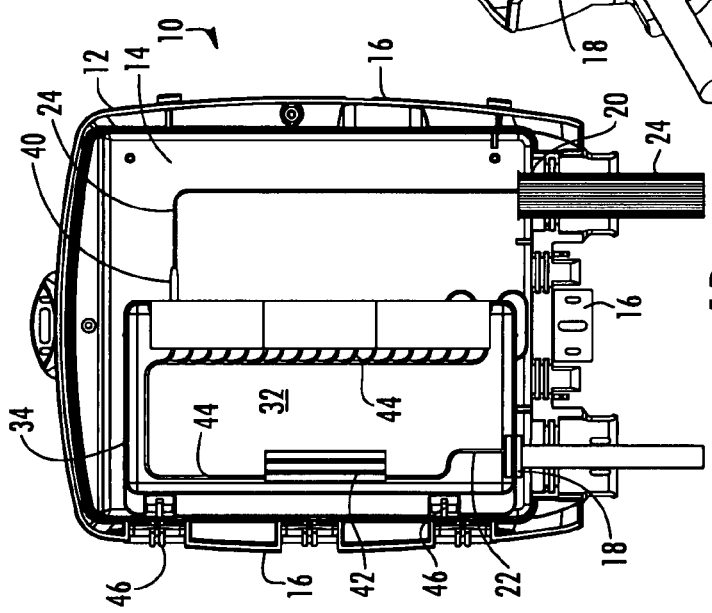
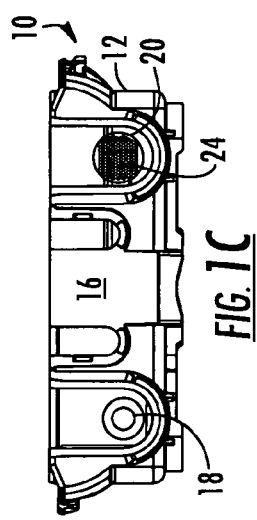

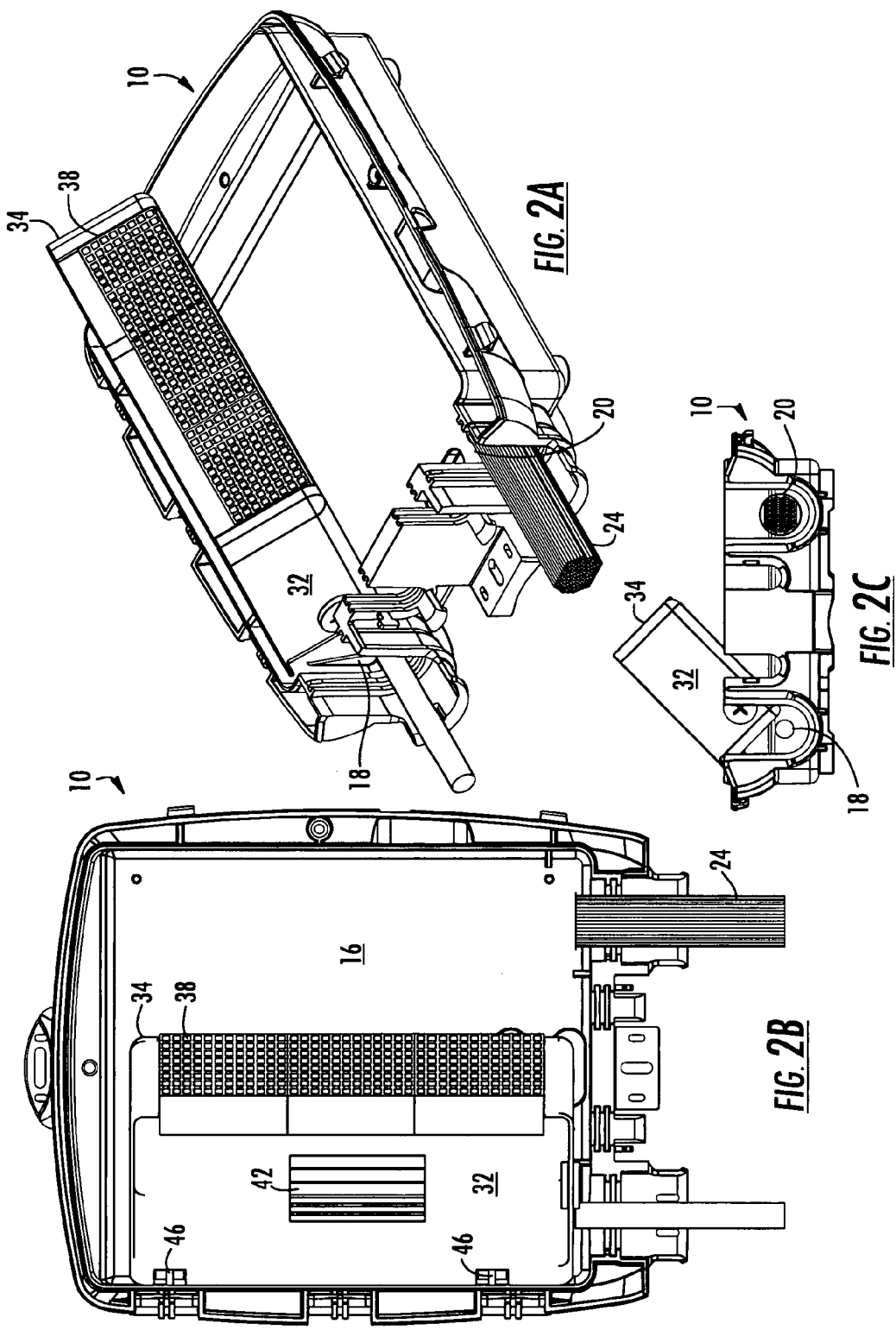

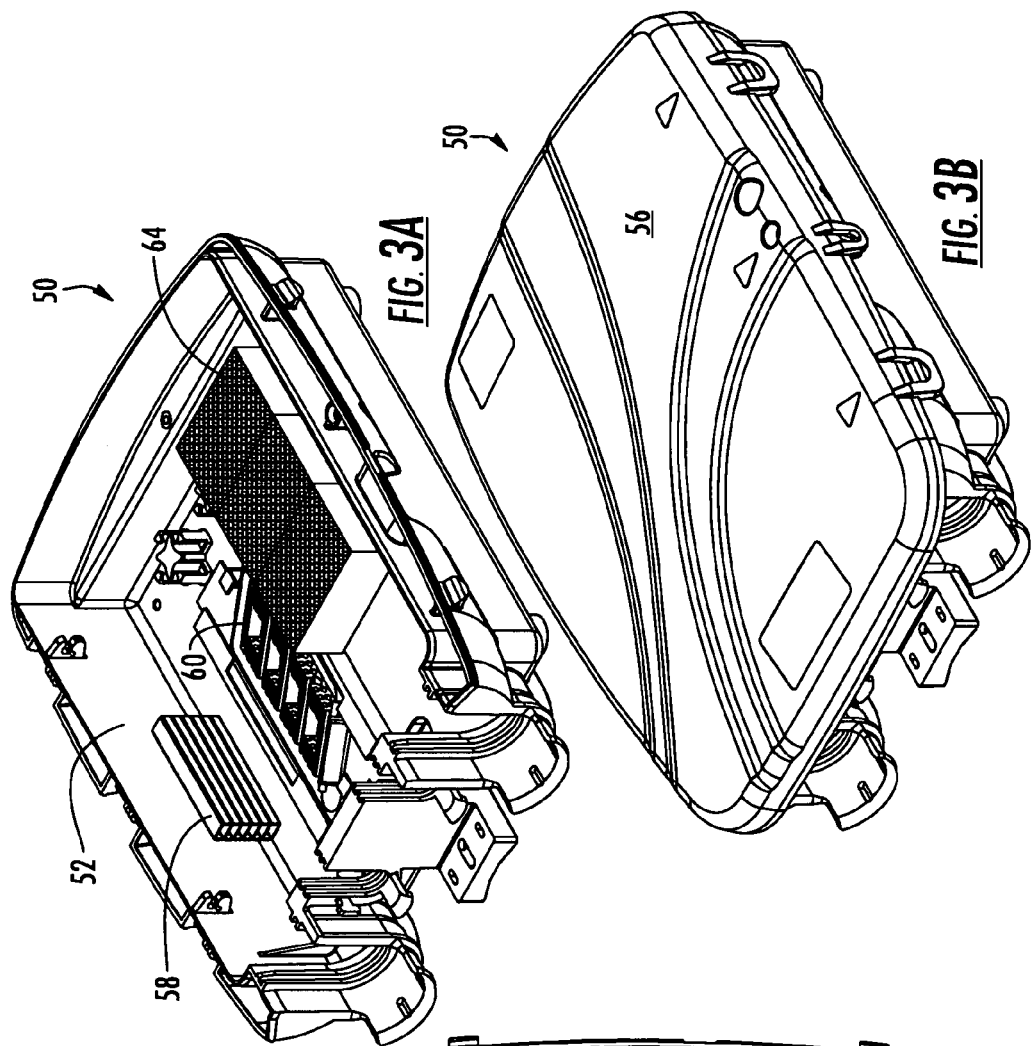
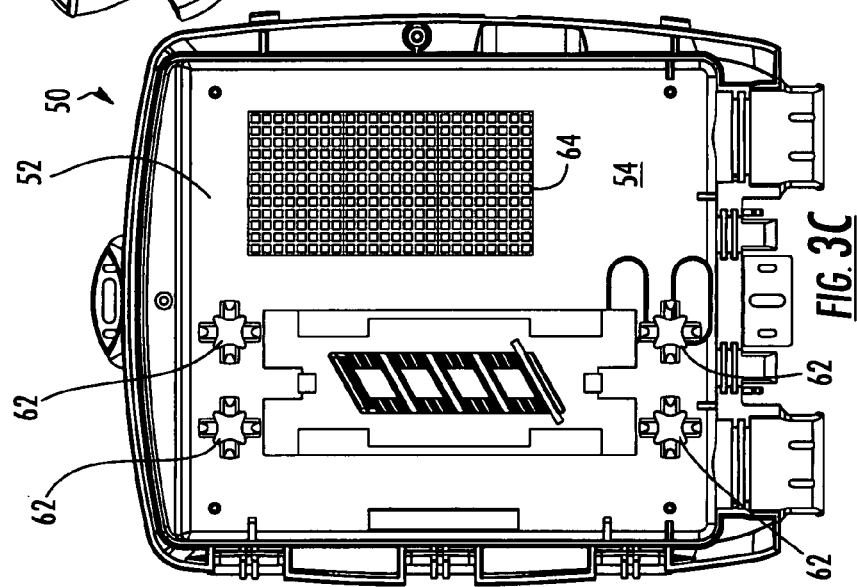

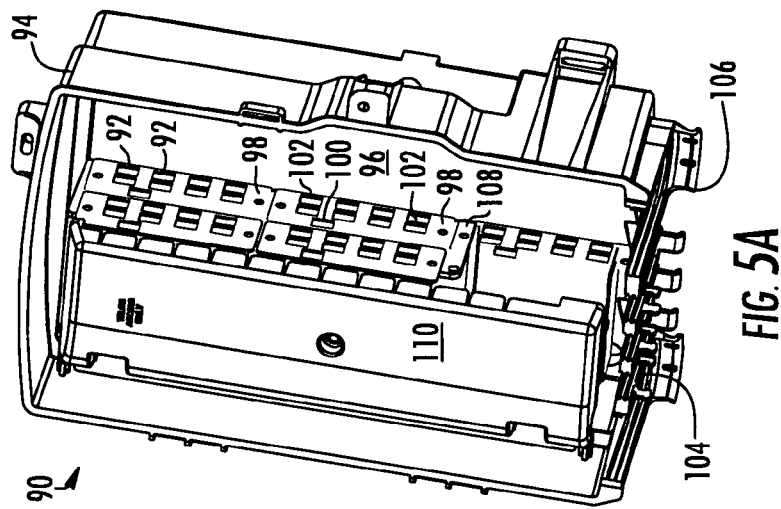
FIG. 5A
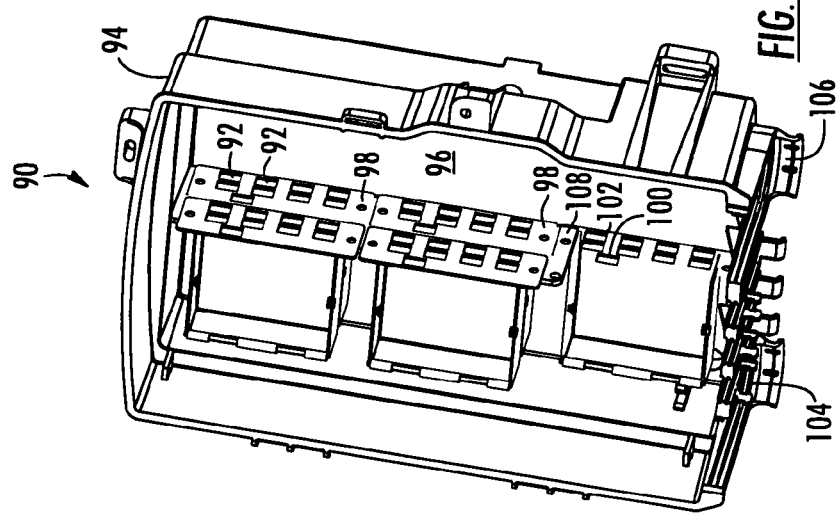
FIG. 5B
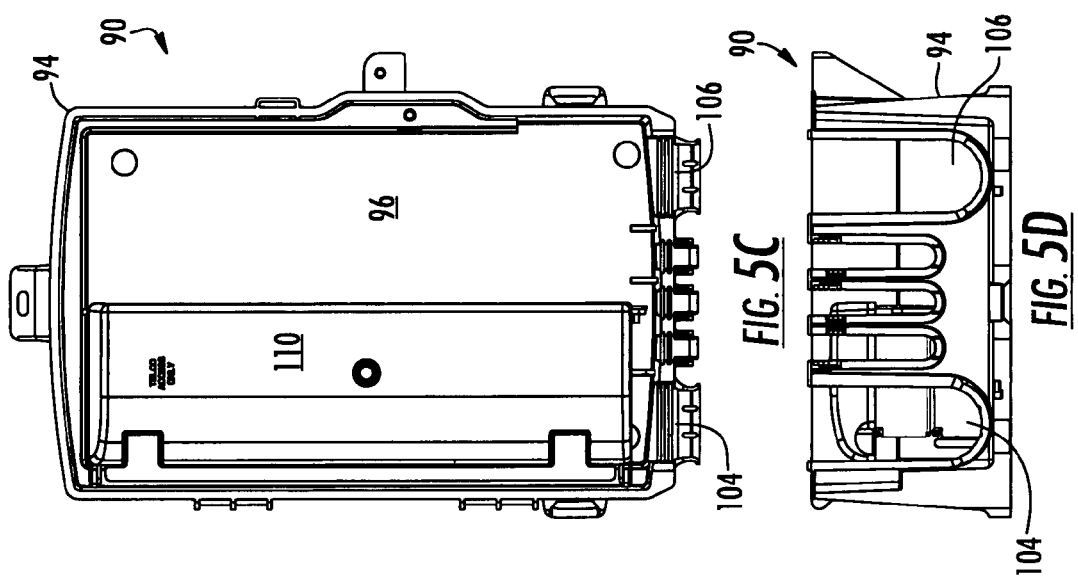
FIG. 5C
FIG. 5D

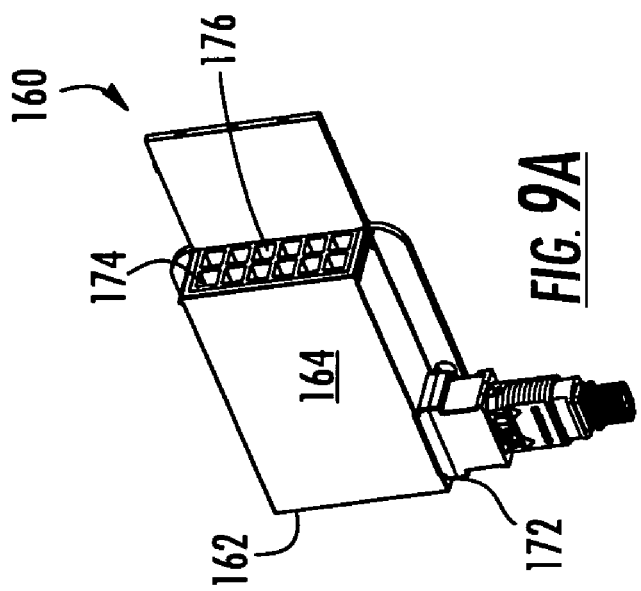
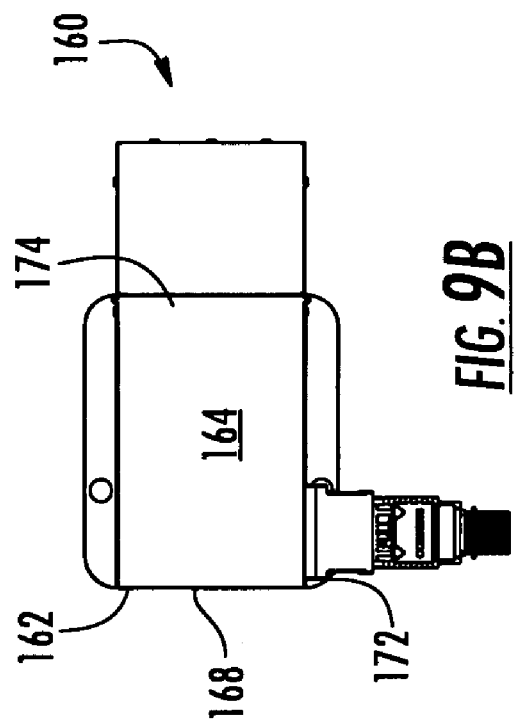
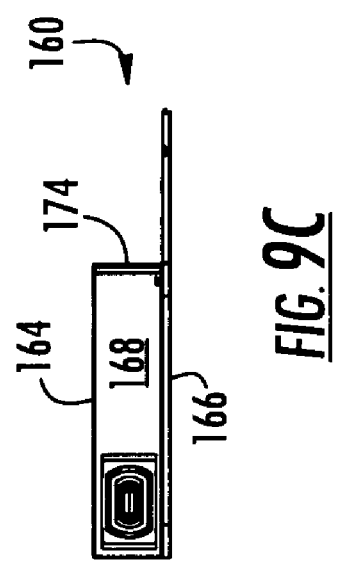

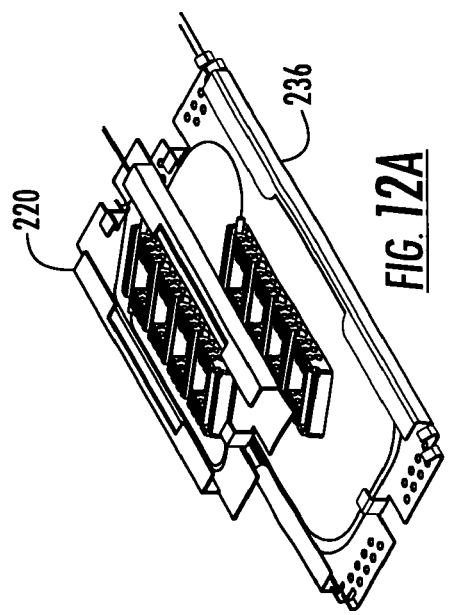
FIG. 12A
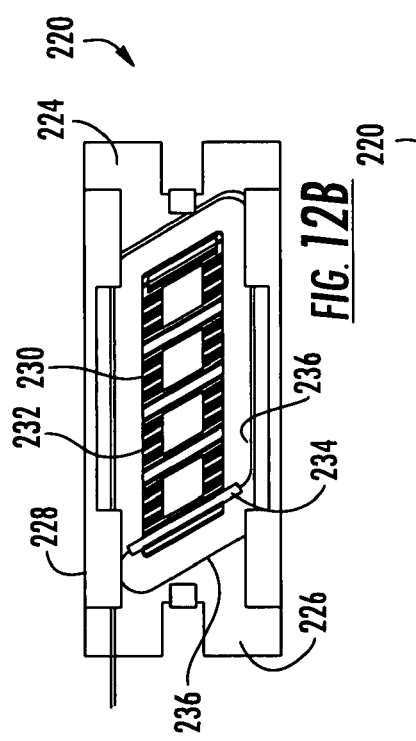
FIG. 12B
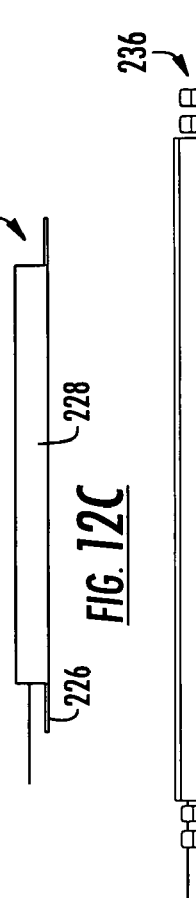
FIG. 12C
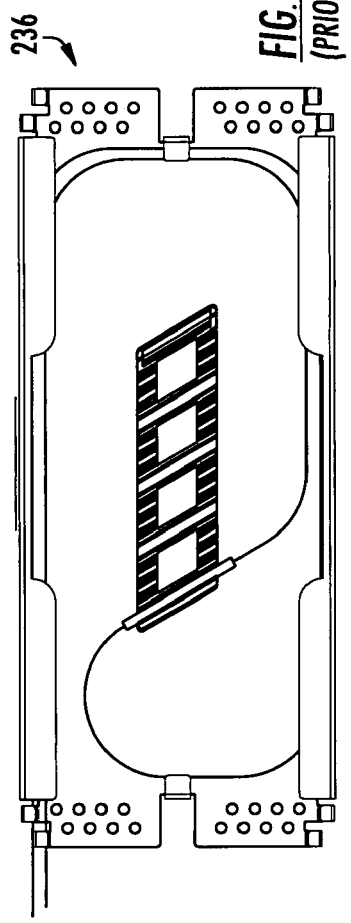
FIG. 12E (PRIOR ART)
FIG. 12D (PRIOR ART)

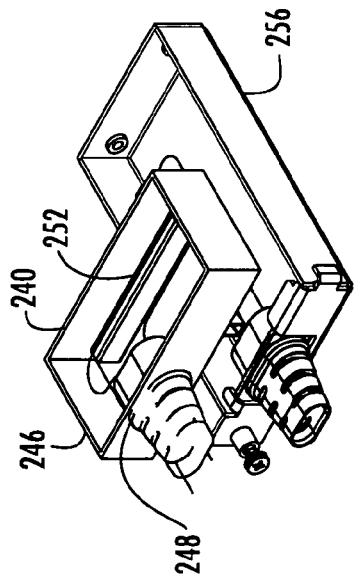
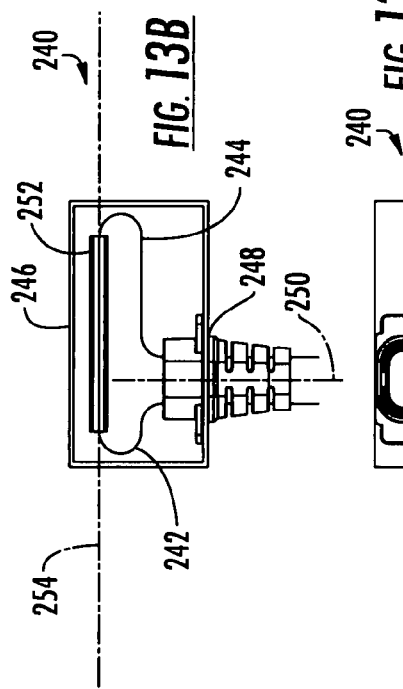
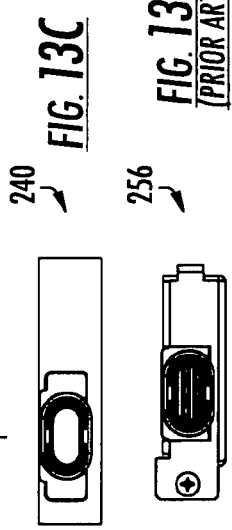
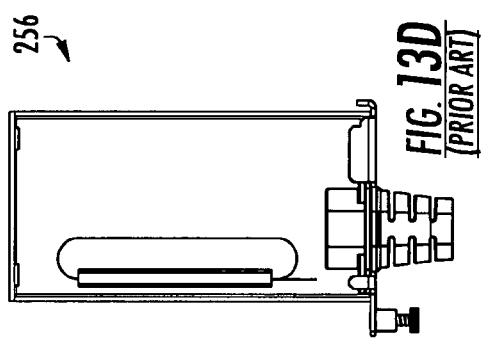

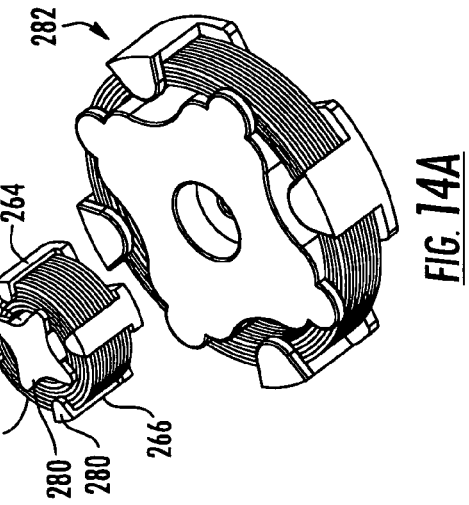
FIG. 14A
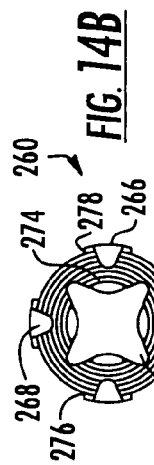
FIG. 14B
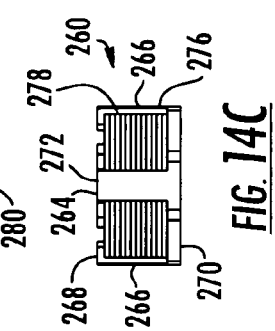
FIG. 14C
FIG. 14E [PRIOR ART]
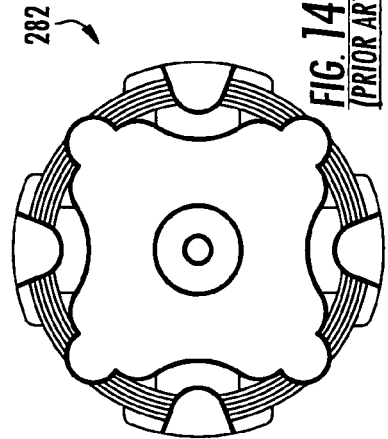
FIG. 14D [PRIOR ART]

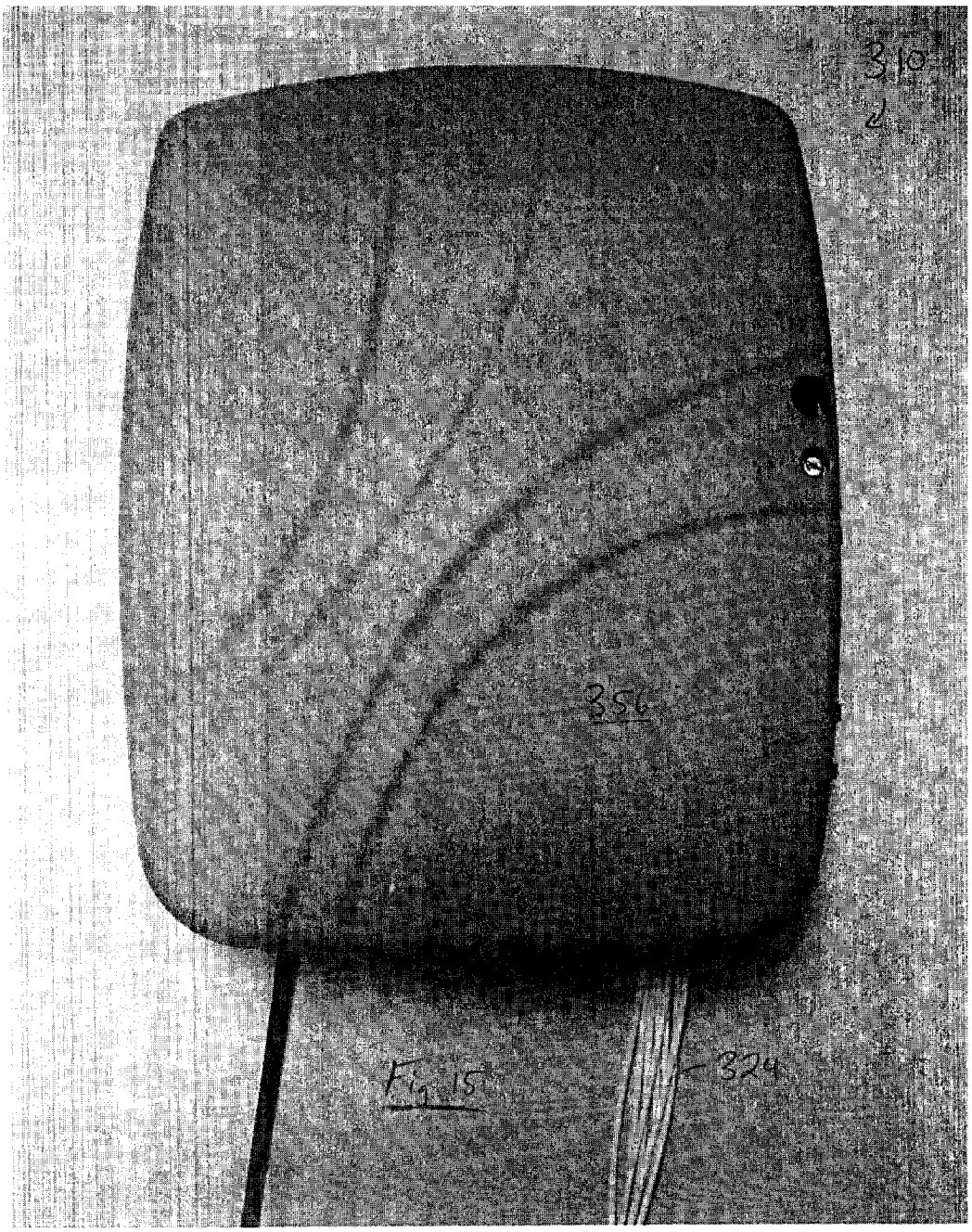

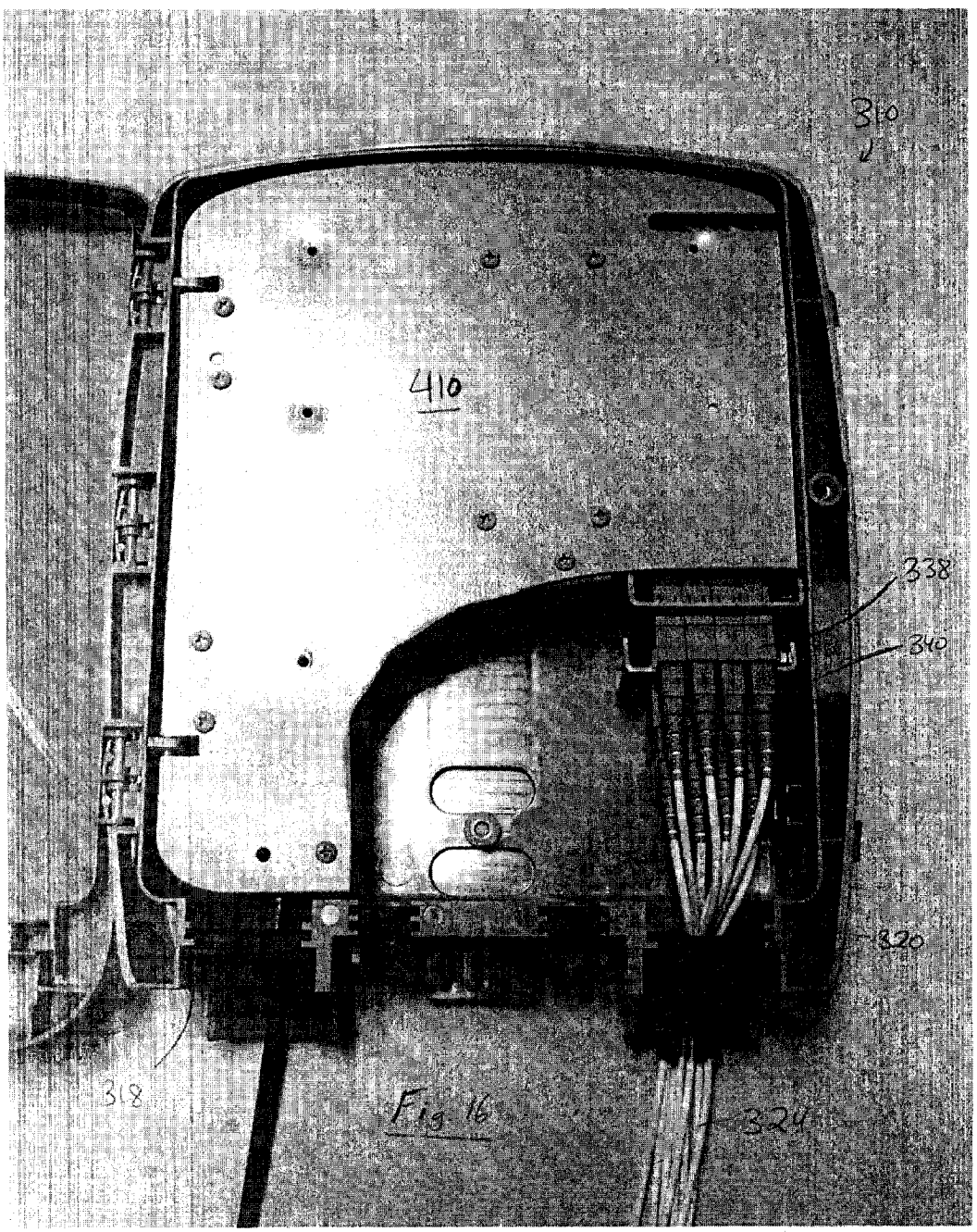

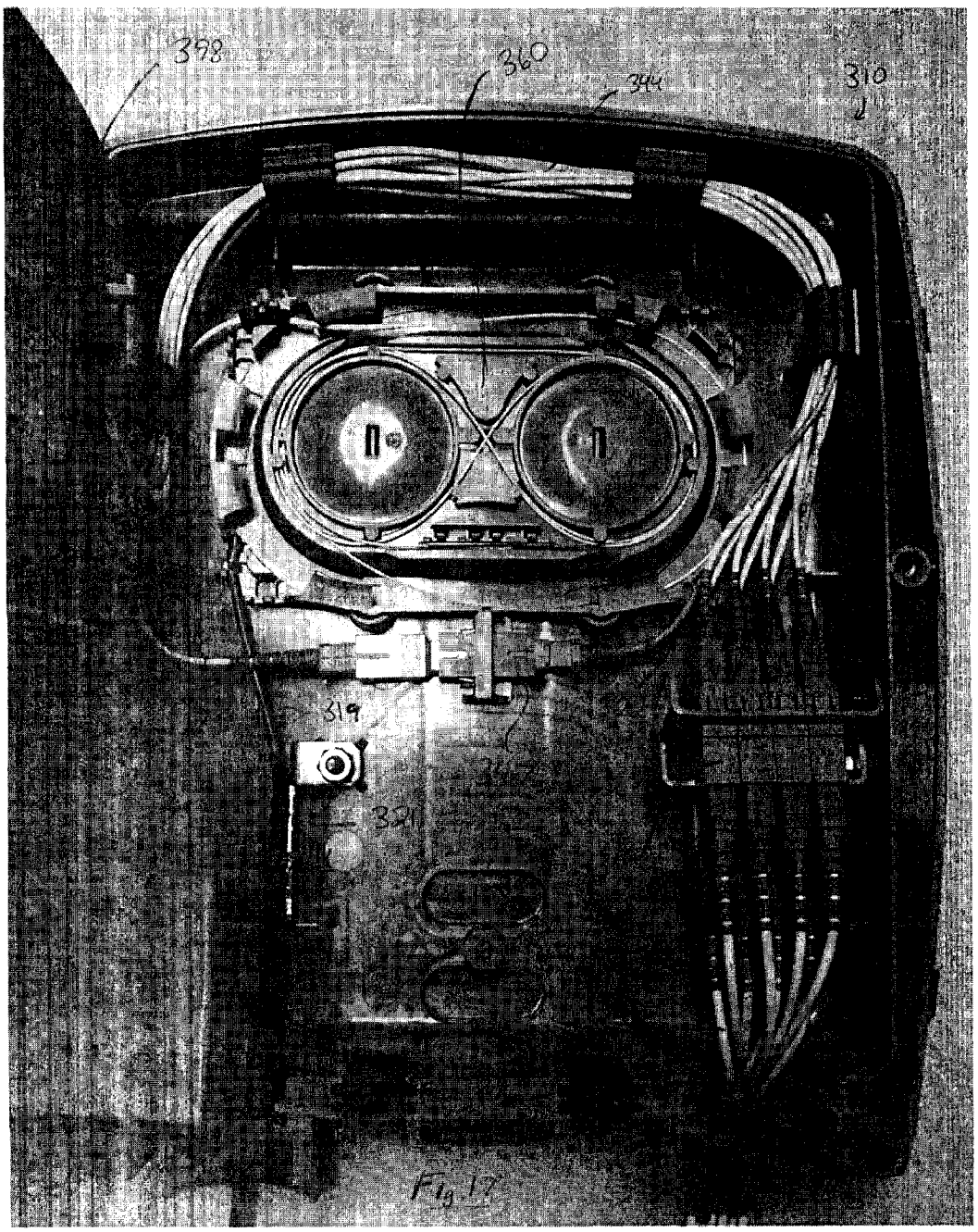

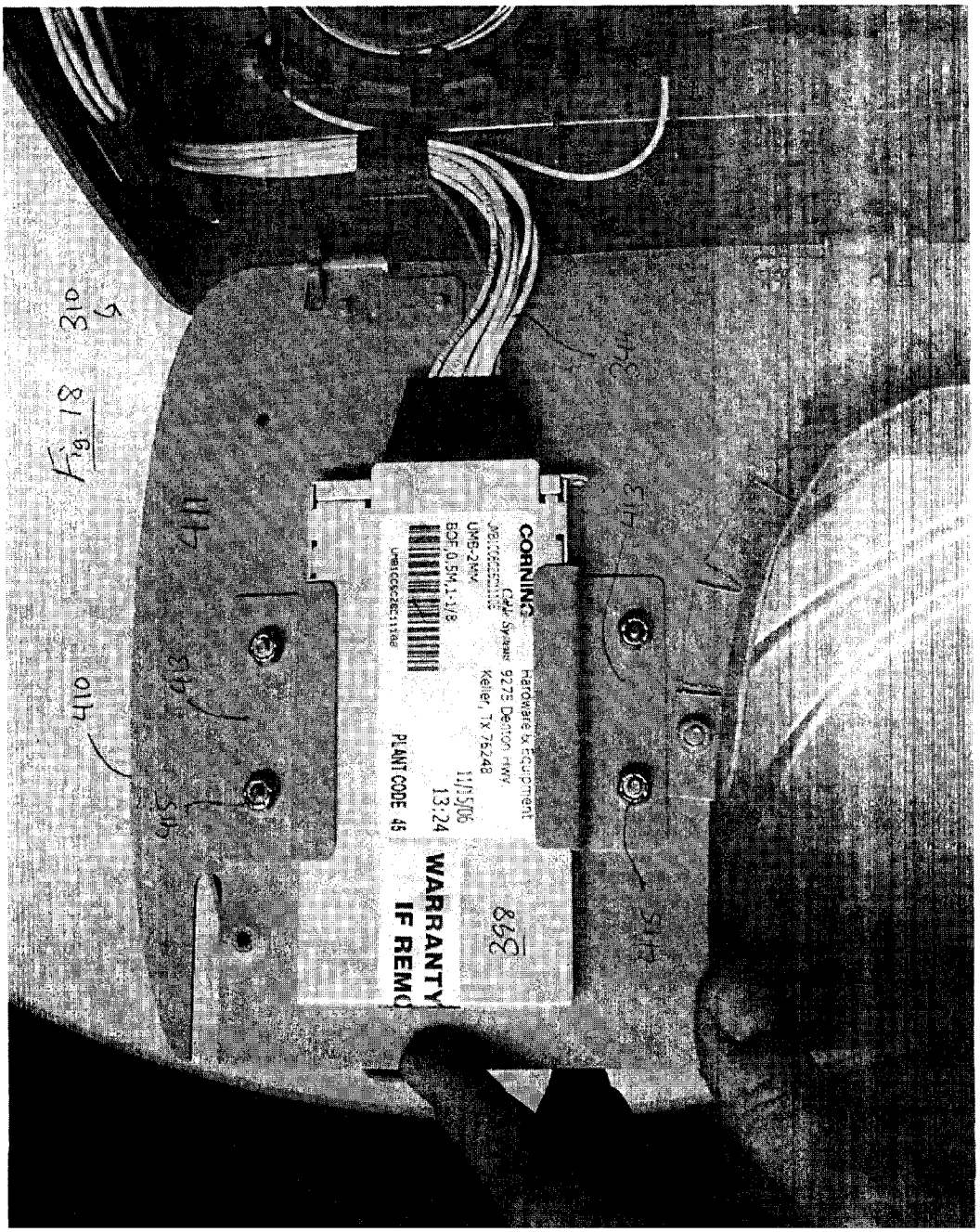

FIBER OPTIC LOCAL CONVERGENCE POINTS FOR MULTIPLE DWELLING UNITS

BACKGROUND OF THE INVENTION

1. Field of the Invention

The present invention is related to fiber optic local convergence points and associated fiber optic hardware, and more particularly, to fiber optic local convergence points adapted for multiple dwelling units.

2. Description of Related Art

To provide improved performance to subscribers, fiber optic networks are increasingly providing optical fiber connectivity directly to the subscribers. As part of various fiber-to-the-premises (FTTP), fiber-to-the-home (FTTH), and other initiatives (generally described as FTTx), such fiber optic networks are providing the optical signals from distribution cables through local convergence points ("LCPs") to fiber optic cables, such as drop cables, that are run directly to the subscribers' premises. Such optical connectivity is increasingly being provided to multiple dwelling units ("MDUs") in part because of the relatively large density of subscribers located in an MDU.

MDUs include apartments, condominiums, townhouses, dormitories, hotels/motels, office buildings, factories, and any other collection of subscriber locations that are in relatively close proximity to one another. MDUs typically are all provided in a single indoor environment, such as an office or condominium; however, MDUs may also include a plurality of individual structures, such as apartment complexes. Typically, if an MDU comprises multiple structures, the optical fibers extending between the structures are adapted for outdoor environments, whereas the optical fibers extending within the structures are adapted for indoor environments. Most conventional MDUs include an LCP located in a generally central and selectively accessible location, such as the basement, utility closet, or the like, or the LCP may be located outside the MDU on an exterior wall, in a pedestal, in a handhole, or the like. The LCP includes at least one fiber optic cable that optically connects to a distribution cable. The LCP also includes a connection point where the subscriber cables routed through the building are optically connected to the distribution cable.

Conventional LCPs for such MDUs are generally sized according to the number of subscribers to be serviced through the LCP, and many of the high density MDUs require large, expensive LCPs that may be difficult to install and/or transport. In addition, conventional LCPs often require skilled technicians to install the LCP and route the associated subscriber cables. Furthermore, highly skilled technicians are required to optically connect, often by splicing, the distribution cable to the LCP and to optically connect and route the subscriber cables to the LCP. Therefore, a need exists for LCPs that are cost-effective, are relatively small in size, and may be installed and maintained by relatively unskilled technicians.

BRIEF SUMMARY OF THE INVENTION

The various embodiments of the present invention address the above needs and achieve other advantages by providing LCPs and associated fiber optic hardware components that provide optical connectivity to relatively large numbers of subscribers using relative small fiber optic hardware components. In addition, some embodiments of the present invention enable installation of the LCPs and associated components by relatively unskilled technicians by removing the need to splice any of the connections between the distribution cable and the subscriber location and by providing optical fibers having significantly smaller minimum bend radii to provide more versatility when routing the subscriber cables through the building.

In one embodiment of the present invention, a fiber optic local convergence point ("LCP") is provided to optically connect at least one input optical fiber to a plurality of output optical fibers. The LCP comprises a cover and a housing with an interior cavity defined by a back wall and a plurality of sides and by the cover. The cover is selectively moveable relative to the housing from an opened position to a closed position to thereby provide access to the interior cavity when the cover is in the opened position. The housing further comprises at least one opening through the housing for the passage of the input optical fibers and the plurality of output optical fibers. The LCP also includes an access cover joined to the housing and generally positioned within the interior cavity of the housing when the cover is in the closed position. The access cover is selectively moveable relative to the housing from an opened position to a closed position to thereby provide access to the provider portion when the access cover is in the opened position. The LCP also comprises a plurality of receptacles adapted to selectively receive fiber optic connectors that are optically connected to the output optical fibers. The LCP further comprises a splitter module that optically connects the input optical fiber with the plurality of receptacles. The splitter module of various embodiments of the present invention is joined to the interior surface of the access cover, to the back wall of the housing, or to the sidewall of the housing. Therefore, the LCPs, cable assemblies, FDTs, and other components of various embodiments of the present invention provide for cost-effective, reduced-size, and easily-installed fiber optic networks for MDUs.

BRIEF DESCRIPTION OF THE SEVERAL VIEWS OF THE DRAWINGS

Figure 4A:
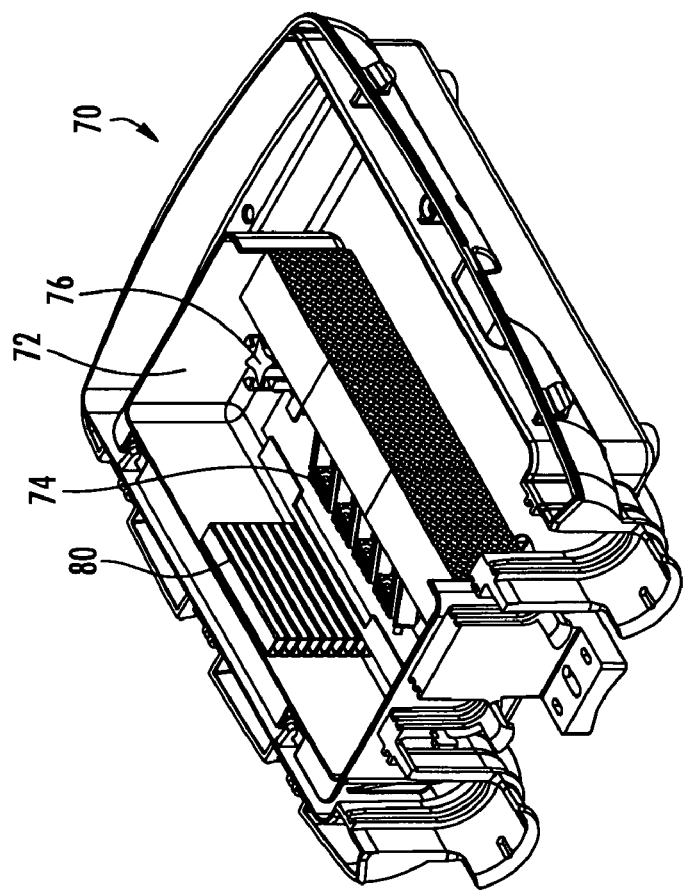
Figure 4B:
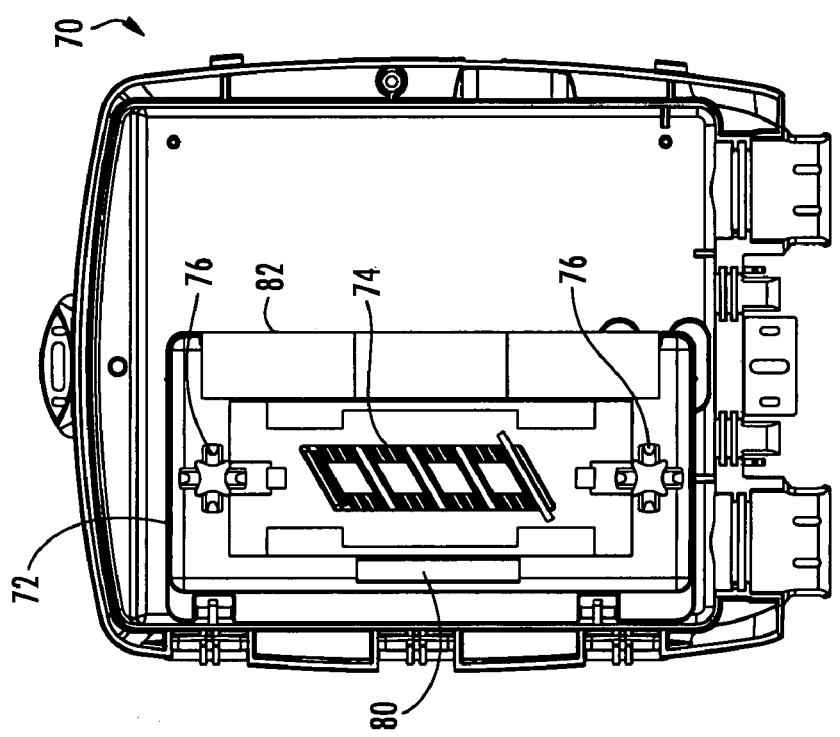
Figure 6:
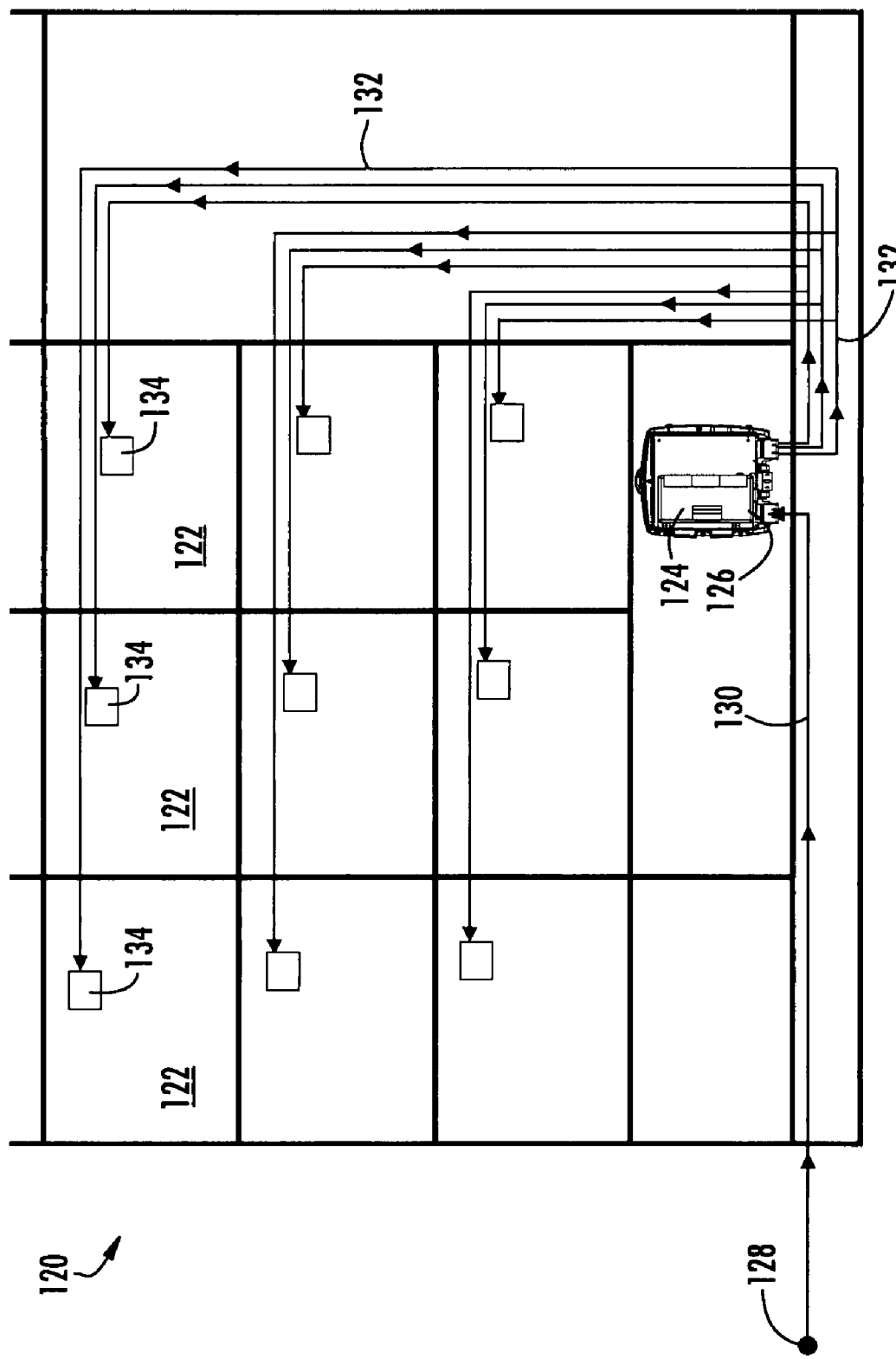
Figure 7:
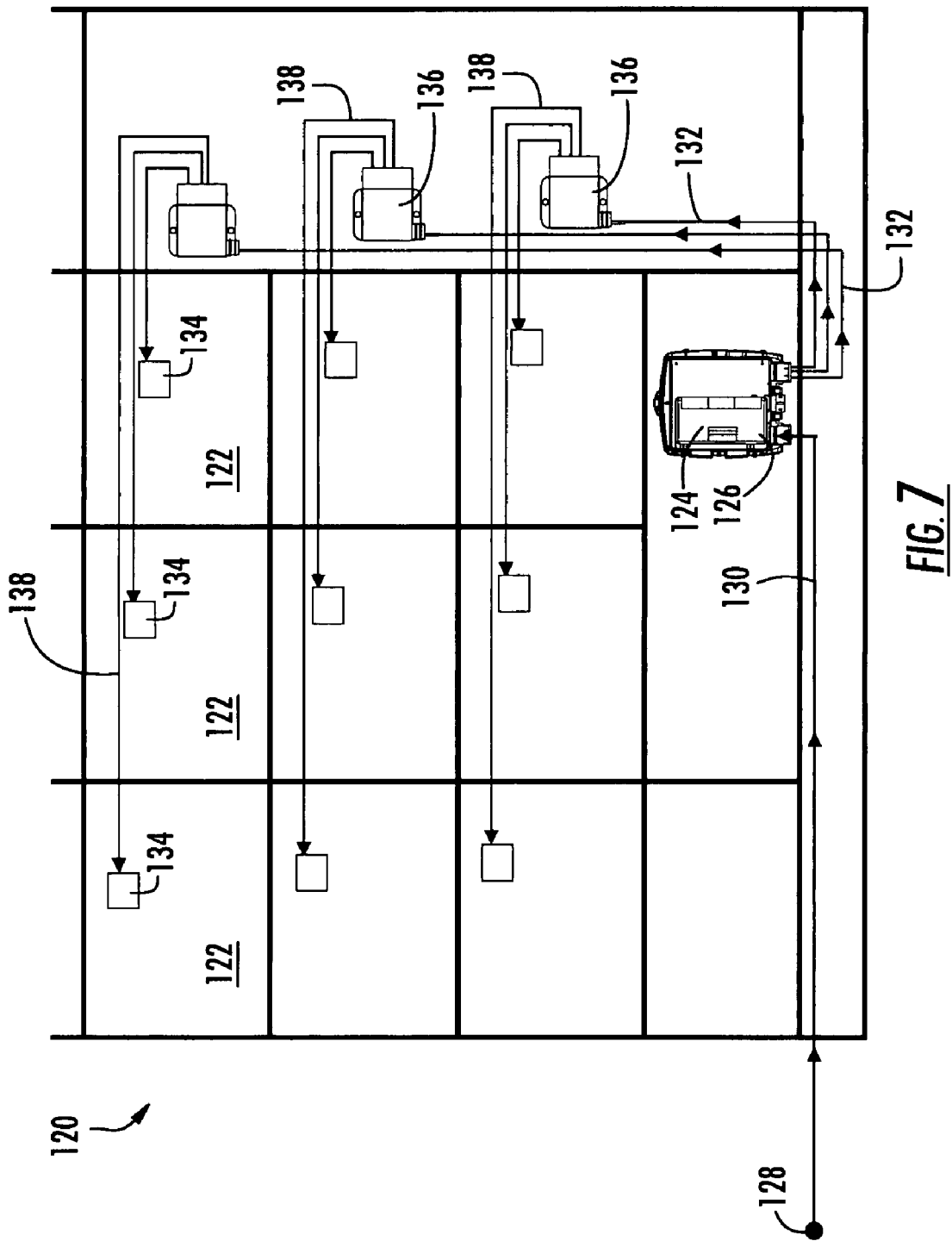
Figure 8A:
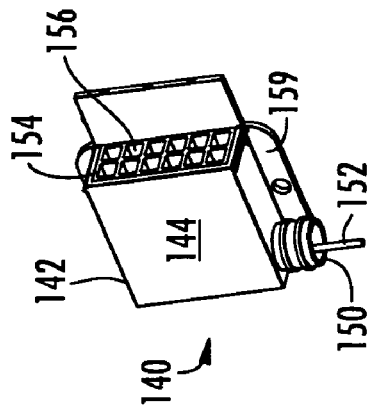
Figure 8B:
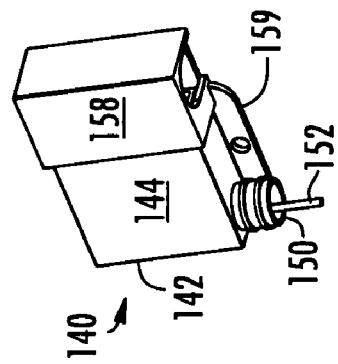
Figure 8C:
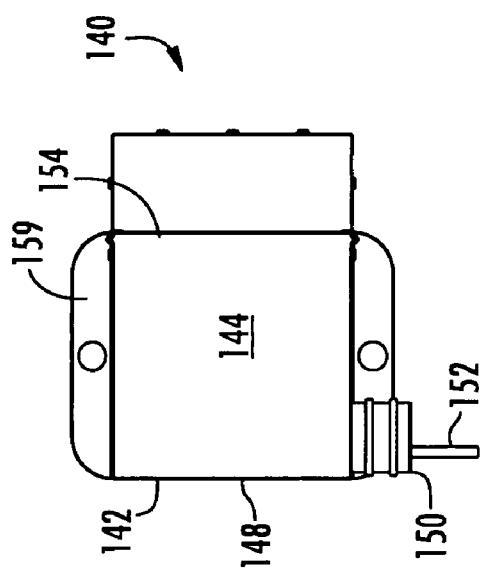
Figure 8D:
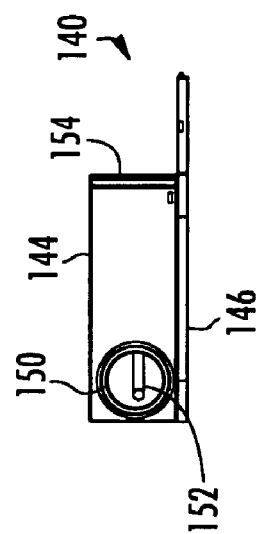
Figure 10A:
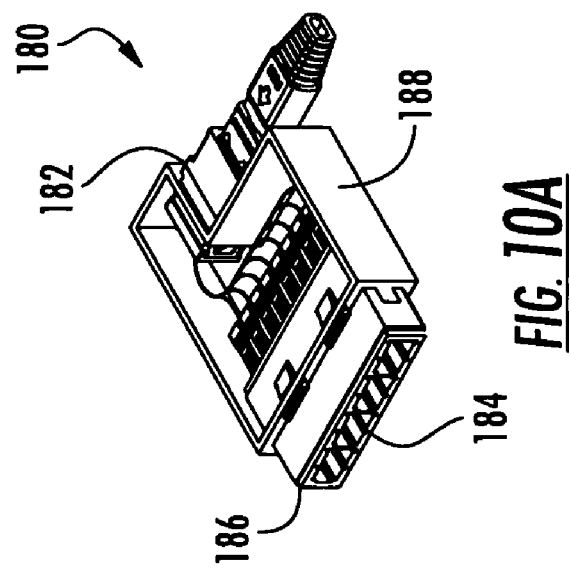
Figure 10B:
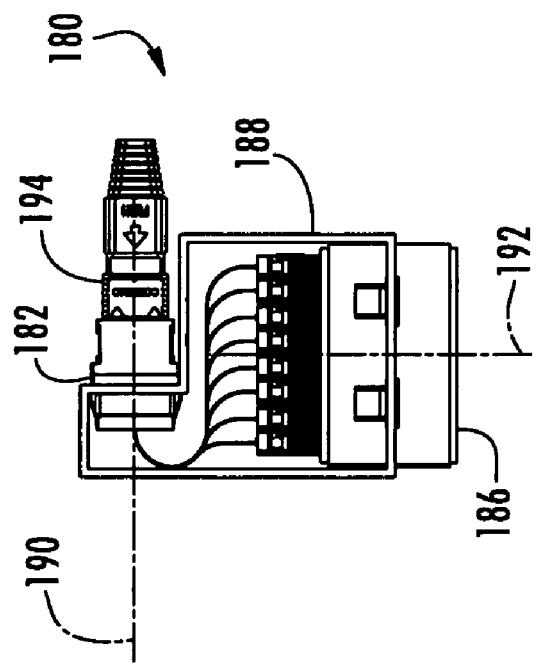
Figure 10C:
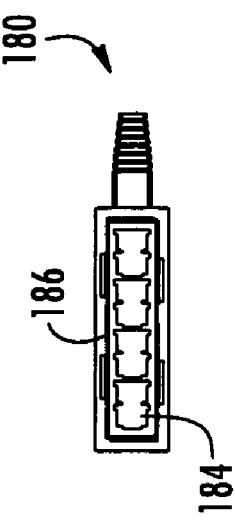
Figure 11A:
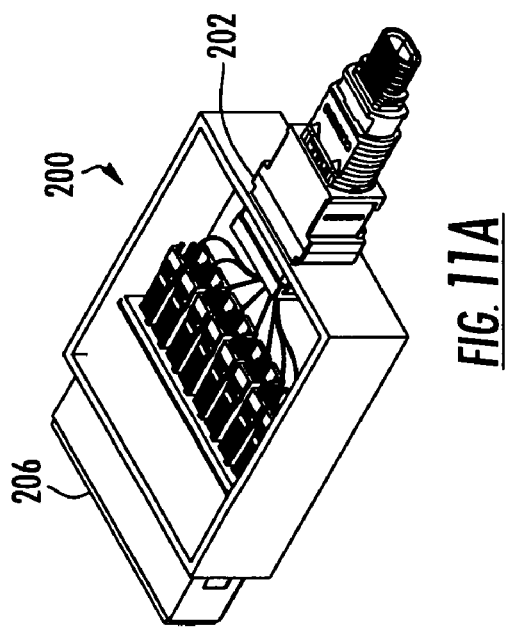
Figure 11B:
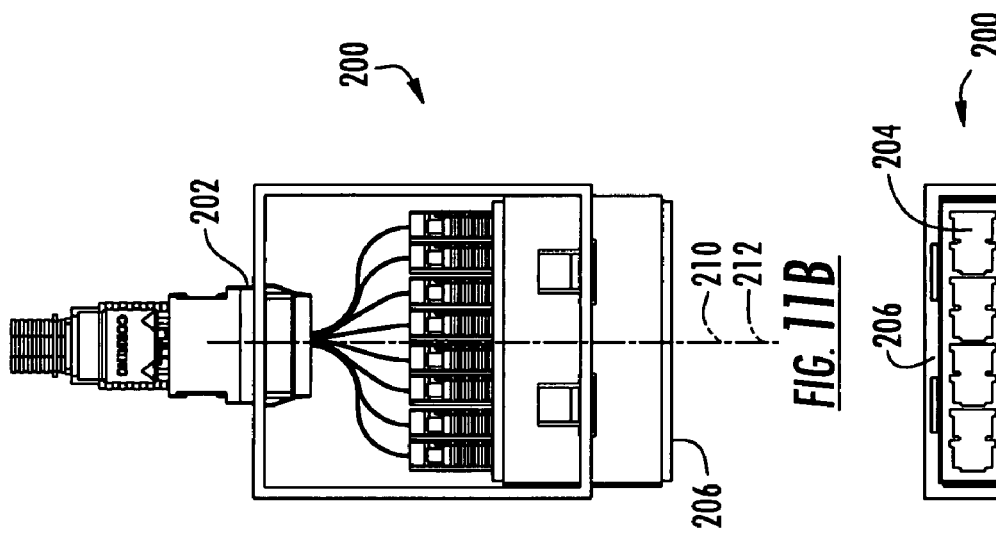
Figure 11C:
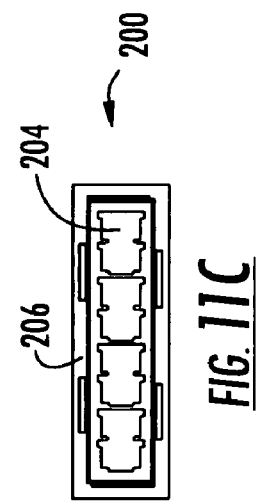

Having thus described the invention in general terms, reference will now be made to the accompanying drawings, which are not necessarily drawn to scale and are meant to be illustrative and not limiting, and wherein:

FIG. 1A is a perspective view of a local convergence point ("LCP") in accordance with one embodiment of the present invention with the cover removed and the splitter end of the cable assembly opened;

FIG. 1B is a top view the LCP of FIG. 1A illustrating the optical fiber routing within the splitter end of the cable assembly and illustrating the subscriber optical fiber;

FIG. 1C is a side view of the bottom of the LCP of FIG. 1A illustrating the openings for the at least one cable assembly optical fiber (left) and the at least one subscriber optical fiber (right);

FIG. 2A is a perspective view of a LCP in accordance with another embodiment of the present invention, illustrating the housing of the LCP removably receiving the splitter end of the cable assembly by rotating the splitter end into the housing;

FIG. 2B is a top view of the LCP of FIG. 2A illustrating the splitter end of the cable assembly at a rotated position;

FIG. 2C is a bottom view of the LCP of FIG. 2A illustrating the splitter end of the cable assembly at a rotated position of about 45 degrees;

FIG. 3A is a perspective view of a LCP in accordance with yet another embodiment of the present invention, illustrating the housing as including a plurality of splitter modules, a splice tray assembly, fiber optic routing guides, and a subscriber termination field comprising a plurality of receptacles, wherein the LCP is free of a splitter end of a cable assembly;

FIG. 3B is a perspective view of the LCP of FIG. 3A with a cover attached and in the closed position;

FIG. 3C is a top view of the LCP of FIG. 3A illustrating the splitter modules, the splice tray assembly, the fiber optic routing guides, and the subscriber termination field;

FIG. 4A is a perspective view of a LCP in accordance with a further embodiment of the present invention, illustrating the splitter end of the cable assembly as including a plurality of splitter modules, a splice tray assembly, fiber optic routing guides, and a subscriber termination field comprising a plurality of receptacles;

FIG. 4B is a top view of the LCP of FIG. 4A illustrating the splitter modules, the splice tray assembly, the fiber optic routing guides, and the subscriber termination field within the splitter end of the cable assembly;

FIG. 5A is a perspective view of a LCP in accordance with a still further embodiment of the present invention, illustrating a plurality of splitter modules housed within the interior cavity of the housing, wherein the splitter modules define multi-fiber output receptacles;

FIG. 5B is a perspective view of the LCP of FIG. 5A illustrating the splitter modules with the access cover removed to allow selective installation and/or removal of the individual splitter modules;

FIG. 5C is a top view of the LCP of FIG. 5A with the access cover installed;

FIG. 5D is a side view of the bottom of the LCP of FIG. 5A illustrating the openings providing passage for the optical fibers to and from the distribution cable and/or the subscriber termination points;

FIG. 6 is a side view of a MDU that includes an LCP and associated fiber optic hardware in accordance with another embodiment of the present invention wherein the fiber optic network does not include at least one FDT such that the subscriber optical fibers are routed directly to the subscriber termination points without the use of the FDT and/or the subscriber drop optical fibers;

FIG. 7 is a side view of a multiple dwelling unit ("MDU") that includes an LCP and associated fiber optic hardware in accordance with one embodiment of the present invention, illustrating the optical signal routing from the distribution cable to LCP via the cable assembly optical fiber to the LCP, then to the FDT via the subscriber optical fiber, and finally to the subscriber termination point via the subscriber drop optical fiber;

FIG. 8A is a perspective view of a fiber distribution terminal ("FDT") in accordance with one embodiment of the present invention illustrating a single input optical cable comprising a plurality of input optical fibers and an output opening comprising a plurality of fiber optic output receptacles;

FIG. 8B is a perspective view of the FDT of FIG. 8A further comprising a removable portion adapted to selectively cover the fiber optic output receptacles when at least one connector is received in the fiber optic receptacles;

FIG. 8C is a top view of the FDT of FIG. 8A illustrating the mounting flanges of the FDT;

FIG. 8D is a side view of the bottom of the FDT of FIG. 8A illustrating the input opening in a sidewall as comprising a through-hole for passage of at least one input optical fiber;

FIG. 9A is a perspective view of a FDT in accordance with a further embodiment of the present invention illustrating an input opening comprising a fiber optic input receptacle and an output opening comprising a plurality of fiber optic output receptacles;

FIG. 9B is a top view of the FDT of FIG. 9A illustrating the mounting flanges of the FDT;

FIG. 9C is a side view of the bottom of the FDT of FIG. 9A illustrating the input opening in a sidewall as comprising a fiber optic input receptacle adapted to receive a multi-fiber connector of the subscriber optical fiber;

FIG. 10A is a perspective view of a FDT in accordance with a still further embodiment of the present invention with a top cover removed, illustrating an input opening comprising a fiber optic input receptacle and an output opening comprising a plurality of fiber optic output receptacles, wherein the FDT defines an input opening axis that is generally orthogonal to an output opening axis;

FIG. 10B is a top view of the FDT of FIG. 10A illustrating the internal routing of the optical fibers from the input opening to the output opening;

FIG. 10C is a side view of the output opening of the FDT of FIG. 10A illustrating the plurality of fiber optic output receptacles adapted to receive MU connectors of the subscriber drop optical fibers;

FIG. 11A is a perspective view of a FDT in accordance with yet another embodiment of the present invention with a top cover removed, illustrating an input opening comprising a fiber optic input receptacle and an output opening comprising a plurality of fiber optic output receptacles, wherein the FDT defines an input opening axis that is generally parallel to an output opening axis;

FIG. 11B is a top view of the FDT of FIG. 11A illustrating the internal routing of the optical fibers from the input opening to the output opening;

FIG. 11C is a side view of the output opening of the FDT of FIG. 11A illustrating the plurality of fiber optic output receptacles adapted to receive MU connectors of the subscriber drop optical fibers;

FIG. 12A is a perspective view of a fiber optic splice tray assembly in accordance with one embodiment of the present invention illustrated above a prior art splice tray assembly, wherein the splice tray assembly of the present invention defines a significantly greater density of splice holders per unit volume of the splice tray assembly as compared to the prior art splice tray assembly;

FIGS. 12B and 12C are top and side views, respectively, of the splice tray assembly of the embodiment of the present invention of FIG. 12A illustrated to scale relative to the prior art splice tray assembly of FIGS. 12D and 12E;

FIGS. 12D and 12E are top and side views, respectively, of the prior art splice tray assembly of FIG. 12A illustrated to scale relative to the splice tray assembly of FIGS. 12B and 12C;

FIG. 13A is a perspective view of a fiber optic splitter module in accordance with one embodiment of the present invention illustrated above a prior art splitter module, wherein the splitter module of the present invention defines a significantly greater density of output optical fibers per unit volume of the housing as compared to the prior art splice tray assembly, and wherein the splitter module of the present invention defines a splitter axis that is generally orthogonal to an opening axis;

FIGS. 13B and 13C are top and side views, respectively, of the splitter module of the embodiment of the present invention of FIG. 13A illustrated to scale relative to the prior art splitter module of FIG. 13A;

FIGS. 13D and 13E are top and side views, respectively, of the prior art splitter module of FIG. 13A illustrated to scale relative to the splitter module of FIGS. 13B and 13C;

FIG. 14A is a perspective view of a fiber optic routing guide in accordance with one embodiment of the present invention illustrated above a prior art routing guide, wherein the routing guide of the present invention is adapted to store a significantly greater amount of length of optical fiber per unit volume of the housing as compared to the prior art routing guide;

FIGS. 14B and 14C are top and side views, respectively, of the routing guide of the embodiment of the present invention of FIG. 14A illustrated to scale relative to the prior art routing guide of FIG. 14A;

FIGS. 14D and 14E are top and side views, respectively, of the prior art routing guide of FIG. 14A illustrated to scale relative to the routing guide of FIGS. 14B and 14C;

FIG. 15 is a front schematic view of a local convergence point ("LCP") in accordance with yet another embodiment of the present invention, illustrating the LCP with the cover in the closed position;

FIG. 16 is a front schematic view of the LCP of FIG. 15, illustrating the cover in the opened position to show the access cover and the plurality of receptacles;

FIG. 17 is a front schematic view of the LCP of FIG. 15, illustrating the access cover in the opened position to show the splice tray assembly and input receptacle; and FIG. 18 is a side schematic view of the LCP of FIG. 15, illustrating the interior side of the access cover to which the splitter module is joined.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing local convergence points ("LCPs") for multiple dwelling units ("MDUs") are described and shown in the accompanying drawings with regard to specific types of LCPs and associated fiber optic hardware, it is envisioned that the functionality of the various apparatus and methods may be applied to any now known or hereafter devised LCPs and associated fiber optic hardware in which it is desired to provide optical connectivity for MDUs. Like numbers refer to like elements throughout.

With reference to FIG. 1A-18, various LCPs and associated fiber optic hardware in accordance with various embodiments of the present invention are illustrated. It should be appreciated that the many embodiments of the present invention include various combinations of the fiber optic hardware described herein. Furthermore, certain embodiments do not include all of the components described herein, non-limiting examples of components that are not included in all embodiments include fiber optic splice tray assemblies, fiber optic routing guides, fiber distribution terminals, subscriber drop optical fibers, and others. In addition, although many embodiments referred to herein are described as having certain dimensions and densities, it should be appreciated that the dimensions are merely exemplary and non-limiting.

Turning now to the LCP 10 of FIGS. 1A-1C, the LCP is adapted for use with a MDU to optically connect at least one optical fiber of a distribution cable to at least one subscriber optical fiber. The LCPs described herein are intended for indoor use; however, further embodiments are adapted for indoor and/or outdoor use and may be mounted to any surface. The LCP 10 of FIGS. 1A-1C include a housing 12 comprising an interior cavity 14 defined by a plurality of sides 16 and by a cover (not shown) that is selectively moveable from an opened position to a closed position to thereby provide access to the interior cavity when the cover is in the opened position. The interior cavity 14 of the LCP 10 is not hermetically sealed and may include a variety of openings to provide access to the interior cavity. The housing 12 of FIGS. 1A-1C comprises at least one surface 16 adapted for mounting the LCP 10 to a structure (not shown) such as wall in a building to provide one non-limiting example. The housing 12 of FIGS. 1A-1C is similar to standard plastic network interface device ("NID") housings offered by Corning Cable Systems of Hickory, N.C.; however, the housings of further embodiments of the present inventions include housings of any shape and/or material sufficient to provide the necessary optical connectivity, environmental protection, and/or structural properties required for the particular application. The housing 12 further comprises at least one opening 18 and 20 through the housing for the passage of at least one optical fiber such as an optical fiber 22 optically connected to at least one optical fiber of a distribution cable (not shown) and such as a subscriber optical fiber 24 optically connected to a subscriber termination point (not shown). It should be appreciated that the opening 20 provides passage for a plurality of subscriber optical fibers which are shown generally outside the housing 12, but for illustrative purposes only one subscriber optical fiber 24 is shown inside the housing 12.

The LCP 10 of FIGS. 1A-1C also includes a cable assembly 30 comprising a connector end (not shown) adapted for optical connection to at least one optical fiber of a distribution cable (not shown) of the fiber optic network. The connector end includes a preconnectorized (factory-prepared connector) end that may be conveniently connected to a connector at an access point on the distribution cable. Conversely, the connector end of further embodiments may not include any connector such that the optical fiber(s) of the connector end must be spliced to the optical fiber(s) of the distribution cable at an access point (that may or may not be factory-prepared) on the distribution cable. Returning again to the embodiment of FIGS. 1A-1C, generally opposite the connector end of the cable assembly 30 is provided a splitter end 32 that defines a casing 34 with an exterior surface 36 that defines a plurality of receptacles 38 adapted to selectively receive fiber optic connectors 40 that are optically connected to the at least one subscriber optical fiber 24. At least one cable assembly optical fiber 22 extends from the connector end to the splitter end to optically connect the splitter end to the connector end (and the distribution cable when the LCP is installed).

The cable assembly optical fiber 22 of FIGS. 1A-1C is optically connected to a splitter 42, such as a 1×8, 1×16, 1×32, and/or 1×64 splitters to provide non-limiting examples of splitters, that splits the optical signal from the optical fiber 22 to a plurality of pigtails 44. The pigtails 44 are optical fibers optically connected to the splitter and that terminate in a connector (not shown) adapted to be received in the receptacles opposite the exterior surface 36, such that receipt of the fiber optic connector 40 by the receptacle 38 optically connects the pigtail to the subscriber optical fiber. Further embodiments of the present invention provide alternative devices to optically connect the cable assembly optical fiber to the plurality of receptacles. The splitter end 32 of FIGS. 1A-1C includes nine 1×32 splitters 42 thus providing up to 288 receptacles 38 adapted to selectively receive fiber optic connectors 40 that are optically connected to the at least one subscriber optical fiber 24. Thus the cable assembly 30 includes nine cable assembly optical fibers to optically connect each of the splitters 42 to the distribution cable. However, further embodiments of the present invention include any number of cable assembly optical fibers, splitters, and receptacles, which are typically dictated by the number of subscriber termination points to be provided within the MDU (and the number of LCPs to be provided in the MDU, as some MDUs include multiple LCPs).

The splitter end 32 of the cable assembly 30 of the LCP 10 of FIGS. 1A-1C is adapted to be removably received within the housing 12 of the LCP. Furthermore, the splitter end 32 of FIGS. 1A-1C is adapted to be received within the housing without opening the casing 34 of the splitter end. Therefore, the LCP 10 may be conveniently installed by a field technician by simply mounting the housing 12 to an appropriate surface, optically connecting the connector end of the cables assembly 30 to the distribution cable, and then inserting the splitter end 32 into the housing. Further embodiments of the present invention comprise an LCP that does not include a housing, but simply comprises the cable assembly, such as the cable assembly 30 of FIGS. 1A-1C. Such us of a cable assembly without the housing would be suitable for certain applications where environmental protection, security, and other considerations are less of a concern. For certain embodiments of the LCP without a housing, the casing of the cable assembly includes features to assist in the convenient mounting of the splitter end (and in some embodiments, the connector end) of the cable assembly relative to the MDU.

Turning again to the LCP 10 of the illustrated embodiments, receipt of the splitter end 32 into the housing 12 is illustrated in FIGS. 2A-2C. An interior surface of the housing 12 includes a clip 46 into which a protrusion of the casing 34 may be selectively received to create a hinge to allow the splitter end to be rotatably joined to the housing of the LCP 10. To install the splitter end 32 into the housing 12, the technician simply connects the protrusions to the respective clips 46 and then rotates the splitter end inward. The splitter end 32 is illustrated in FIGS. 2A-2C as being at about a 45 degree angle relative to the housing; however, the splitter end may rotate any amount permitted by the housing (for this example from at least 0 degrees to 90 degrees); however, further embodiments of the present invention include splitter ends that rotate at any angles relative to the housing and splitter ends that are selectively received by the housing in alternative fashions, such as with fasteners, with retaining clips requiring linear insertion or alternative insertion techniques, with adhesives, and with any suitable retention devices and/or techniques. As previously mentioned, the splitter end 32 of FIGS. 1A-2C is adapted to be received within the housing without opening the casing 34 of the splitter end. Furthermore, the splitter end of the cable assembly is adapted to be removably received within the housing 12 of the LCP 10 without requiring any splice operation and/or connectorization operation. The splitter end 32 is factory prepared to include all the necessary optical connectivity from the connector end to the plurality of receptacles such that a technician would not be required to open the casing 34. However, it should be appreciated that the casings of some embodiments of the present invention provide devices and/or techniques for selectively opening and closing the casing 34 in the field to permit selective access within the casing. Still further embodiments of the present invention include splitter ends that do not include any casing, such as the LCP 50 of FIGS. 3A-3B.

The LCP 50 of FIGS. 3A-3C is one embodiment of the present invention that does not include a casing for the splitter end 52. Rather than having an encased splitter end, the splitter end 52 of FIGS. 3A-3C is positioned within the interior cavity 54 as individual components, preferably in the factory, but possibly in the field. FIG. 3B illustrates the cover 56 that is selectively movable from an opened position to a closed position (FIG. 3B) to provide access to the interior cavity 54. The splitter end 52 of the LCP 50 may be factory prepared to include all the fiber optic hardware components shown and to allow a field technician to provide a number of operations on the various components. The splitter end 52 includes a plurality of splitters 58, at least one splice tray assembly 60, at least one fiber optic routing guide 62, and a subscriber termination field comprising a plurality of receptacles 64. By providing the fiber optic hardware components individually within the LCP 50, a network provider is given the option of purchasing the LCP with the minimum amount of fiber optic hardware components required at the time of installation and then add additional components as additional subscribers need connection to the network. Still further advantages are provided by providing the splitter end 52 of FIGS. 3A-3C. The cable assembly optical fiber(s) (not shown) is routed to the splitters 58 where the optical signal is split into a plurality of optical fibers. The optical fibers may be spliced, by either single splices for individual fibers or mass fusion splicing for multi-fiber cables such as ribbon cables, and placed within the splice tray assembly. The optical fibers from the splitters may be spliced to pigtails that may be inserted into a side of the receptacles 64 opposite the side into which the connector of the subscriber optical fiber will be received. Although the splice tray assembly 60 does accommodate a certain amount of fiber optic slack, such as an amount of slack necessary to perform the splice operation, the fiber optic routing guides 62 also provide slack storage for the optical fibers from the splitters and/or for the pigtails. Still further embodiments of the present invention may provide additional and/or alternative fiber optic components in the interior cavity of the housing of the LCP.

Turning now to the LCP 70 of FIGS. 4A and 4B, the splitter end 72 does include fiber optic splice tray assembly 74 and fiber optic routing guides 76 within the casing 78. The splitter end 72 also includes a plurality of splitters 80 and the plurality of receptacles 82 similar to the embodiments of FIGS. 1A-2C. Therefore, the LCP 70 of FIGS. 4A and 4B includes some of the functionality of the LCP 50 of FIGS. 3A-3C, while also providing the ease of installation of the LCP 10 of FIGS. 1A-2C. Still further advantages can be realized by combining the various fiber optic hardware components and techniques of the embodiments of FIGS. 1A-4B and further embodiments of the present invention.

In addition to providing convenient installation of the LCP within and/or near the MDU, the LCPs of certain embodiments of the present invention also provide improved density of connections, which significantly reduces the cost of the hardware and enables technicians to more easily install the LCP and associated fiber optic hardware and to increase the possible places the LCP and associated fiber optic hardware may be installed and/or mounted. Whereas prior art LCPs generally define a width of 13.5 inches, a height of 15.5 inches, and a depth of 5.5 inches along the exterior of the LCP while providing only 48 receptacles for subscriber optical fibers, the LCPs of the illustrated embodiments of the present invention generally define a width of 9.8 inches, a height of 12.6 inches, and a depth of 3.8 inches while providing 288 receptacles for subscriber optical fibers. Therefore, the prior art LCPs define a density of receptacles per unit of volume of the housing of about 0.042 receptacles/$in^3$, and the LCPs of the illustrated embodiments define a density of receptacles per unit of volume of the housing of about 0.614 receptacles/$in^3$, which is a significant improvement in density that can be used to provide smaller LCPs and/or provide additional optical connectivity with the LCPs of the present invention. Various embodiments of the present invention preferably provide a density of receptacles per unit of volume of the housing from about 0.10 receptacles/in$^3$ to about 4.0 receptacles/in$^3$, more preferably a density of receptacles per unit of volume of the housing from about 0.25 receptacles/in$^3$ to about 2.0 receptacles/in$^3$, and still more preferably a density of receptacles per unit of volume of the housing from about 0.50 receptacles/in$^3$ to about 1.0 receptacles/in$^3$.

The LCPs of FIGS. 1A-4B include receptacles that are adapted to receive connectors of subscriber optical fibers that comprise 5 mm optical connectors, which may be arranged in relatively dense patterns as a distance of only 5 mm is required between centers in both lateral and longitudinal directions ("5 mm optical connectors"). Still further embodiments of the present invention include receptacles adapted to receive MU connectors that may also be arranged in relatively dense patterns, but require 4.5 mm to 5 mm between centers in either a lateral or longitudinal direction and about 10 mm in the opposite direction; thereby requiring slightly large volume than the 5 mm optical connectors. Additional embodiments of the present invention include receptacles adapted to receive SC, LC, ST, FC, MT-RJ, MTP, and other fiber optic connectors and adapted to receive single-mode or multimode fibers in simplex, duplex, or multi-fiber arrangements.

FIGS. 5A-5D illustrate yet another LCP 90 of the present invention, wherein the LCP includes a plurality of multi-fiber receptacles 92 adapted to received multi-fiber connectors (not shown) of the subscriber optical fibers. The housing 94 of the LCP 90 defines an interior cavity 96 into which a plurality of splitter modules 98 may be received. Rather than providing a cable assembly as in the embodiments discussed above, the LCP 90 is adapted to house a plurality of splitter modules 98. The splitter modules 98 of the illustrated embodiments includes a single input opening 100 and a plurality of output openings 102 to which optical fibers may be routed and connected via multi-fiber connectors (not shown). The optical fibers pass through the openings 104 and 106 similar to the embodiments described above; however, it would be possible to change the routing if desired by the technician. The splitter modules 98 include a splitter (not shown) that splits the optical signal received through the input opening 100 to the plurality of receptacles of the output openings. The splitter modules 98 are installed by fastening them to brackets 108 provided in the interior cavity 96 of the housing 94; however, further embodiments may install the splitter modules in alternative fashions, such as by providing a splitter end of a cable assembly wherein the splitter end is adapted to receive at least one splitter module within the splitter end, to describe one non-limiting example. The LCP 90 of FIGS. 5A-5D includes an access cover 110 to limit access to the splitter modules to technicians. The splitter modules of certain embodiments of the present invention include the splitter modules of FIGS. 13A-13D described in more detail below.

FIGS. 6 and 7 illustrate the LCPs (not to scale) of certain embodiments of the present invention installed in an MDU 120. The MDU 120 of FIGS. 6 and 7 comprises an apartment building having nine dwelling units 122 for illustrative purposes only. The LCP 124 is positioned on the ground floor or basement in the illustrated embodiment; however, the LCP of further embodiments is positioned at any location relative to the MDU. The LCP 124 includes a cable assembly 126 that is optically connected to a distribution cable 128 via the cable assembly optical fiber(s) 130 as described above. As also described above, the subscriber optical fibers 132 that are connected to the receptacles of the LCP 124 exit the LCP and extend throughout the MDU. The subscriber optical fibers 132 of FIG. 6 extend directly to each dwelling unit and terminate at a subscriber termination point 134, such as an adapter in a wall outlet, an adapter in a floor panel, an adapter behind a ceiling tile, or the like such that the subscriber can optically connect directly (or indirectly in some situations) to the subscriber optical fiber 132. Although the optical fibers 130 and 132 include arrows pointing in the direction of the subscriber termination points 134, it should be appreciated that optical signals may be passed in either direction as required for the particular application; the arrows are merely provided for illustrative purposes.

FIG. 7 is also provided to illustrate embodiments in which the subscriber optical fiber 132 is optically connected to a fiber distribution terminal ("FDT") 136 (not to scale) rather than the subscriber termination point 134. FDTs are provided to simplify the routing and installation of the optical fibers between the LCP 124 and the subscriber termination points 134 by allowing the subscriber optical fibers 132 to be grouped between the LCP and FDT and then separated at the FDT. More specifically, the subscriber optical fibers 132 of FIG. 7 comprise multi-fiber cables comprising a plurality of optical fibers, such as ribbon fiber to provide one non-limiting example. As explained more fully below, the subscriber optical fiber 132 is separated into multiple subscriber drop optical fibers 138 that are routed from the FDT 136 to the subscriber termination points 134. As shown in FIG. 7, each floor of the MDU 120 includes a FDT, such that each of the three subscriber optical fibers 132 is divided into three subscriber drop optical fibers 136. Accordingly, there are fewer optical fibers and/or cables extending between the floors of the MDU thus simplifying routing of optical fibers through the MDU. Although floors of an MDU are described in the illustrated embodiments, it should be appreciated that FDTs may be used to facilitate optical fiber routing to any layout of areas within an MDU.

Turning now to the FDTs of FIGS. 8A-11C, various FDTs are included in the present invention. The FDT 140 of FIGS. 8A-8D comprises a generally rectangular housing 142 that defines a top wall 144, a bottom wall 146, and a sidewall 148 extending therebetween. The FDT 140 includes an input opening 150 defined in the sidewall 148, and the input opening is adapted to receive at least one input optical fiber. For the FDT 140 of FIGS. 8A-8D, the input opening 150 receives a single subscriber optical cable 152 that comprises twelve subscriber optical fibers. The FDT 140 defines a direct cable input as compared to the multi-fiber connector input of the embodiment of FIGS. 9A-9C described below. The FDT 140 of FIGS. 8A-8D also includes an output opening 154 defined in the sidewall 148. The output opening 154 comprises a plurality of fiber optic output receptacles 156 adapted to receive fiber optic connectors, such as from a subscriber drop optical fiber (not shown), to optically connect the fiber optic connector to a respective one of the input optical fibers. The FDTs of further embodiments of the present invention are adapted to receive any number of input optical fibers and provide any number of fiber optic output receptacles. The FDT 140 of FIG. 8B includes a removable portion 158 adapted to selectively cover the fiber optic output receptacles when one or more fiber optic connectors are received in the fiber optic output receptacles to generally protect the connectors from unintentional disconnection, as well as other undesirable problems that may be created by unintentional contact of foreign objects with the connectors. The removable portion 158 of FIG. 8B may be easily connected and disconnected by a technician using clips, fasteners, and the like when the technician accesses the output opening 154 and the fiber optic output receptacles 156. The FDT 140 also includes one or more mounting flanges 159 to provide easy installation of the FDT within the MDU.

The FDT 140 of FIGS. 8A-8D provides a significant advantage over prior art FDTs in that the FDT 140 provides easy installation and connectivity, as well as requiring significantly less volume than prior art FDTs. Prior art FDTs typically use a housing similar to the LCP housings described above or an even larger cabinet or the like. Therefore, prior art FDTs provide for only about a density of receptacles per unit of volume of the housing of about 0.042 receptacles/in$^3$. However, the FDT 140 of FIGS. 8A-8D generally defines (not including the mounting flanges or removable portion area) a width of 1.38 inches, a height of 1.35 inches, and a depth of 0.55 inches while providing 12 receptacles for subscriber optical fibers. Therefore, the FDT 140 provides a density of receptacles per unit of volume of the housing of about 11.7 receptacles/in$^3$, which is a significant improvement in density over the prior art. Various embodiments of the present invention preferably provide direct cable input FDTs having a density of receptacles per unit of volume of the housing from about 1.0 receptacles/in$^3$ to about 40 receptacles/in$^3$, more preferably a density of receptacles per unit of volume of the housing from about 5.0 receptacles/in$^3$ to about 20 receptacles/in$^3$, and still more preferably a density of receptacles per unit of volume of the housing from about 10 receptacles/in$^3$ to about 15 receptacles/in$^3$.

Referring now to the FDTs of FIGS. 9A-9C, a multi-fiber connector input FDT 160 is provided. The FDT 160 of FIGS. 9A-9C comprises a generally rectangular housing 162 that defines a top wall 164, a bottom wall 166, and a sidewall 168 extending therebetween. The FDT 160 includes an input opening 170 defined in the sidewall 168, and the input opening is adapted to receive at least one input optical fiber. For the FDT 160 of FIGS. 9A-9C, the input opening 170 provides a multi-fiber receptacle 172 to which a multi-fiber connecter may be selectively received. The multi-fiber connector of the subscriber optical cable (not shown) comprises twelve subscriber optical fibers. The FDT 160 of FIGS. 9A-9C also includes an output opening 174 defined in the sidewall 168. The output opening 174 comprises a plurality of fiber optic output receptacles 156 adapted to receive fiber optic connectors, such as from a subscriber drop optical fiber (not shown), to optically connect the fiber optic connector to a respective one of the input optical fibers. The FDTs of further embodiments of the present invention are adapted to receive any number of input optical fibers and to provide any number of fiber optic output receptacles.

Similar to the direct cable input FDT 140 of FIGS. 8A-8D, the multi-fiber connector input FDT 160 of FIGS. 9A-9C provides a significant advantage over prior art FDTs in that the FDT 140 provides easy installation and connectivity, as well as requiring significantly less volume than prior art FDTs. As mentioned above, prior art FDTs typically provide a density of receptacles per unit of volume of the housing of about 0.042 receptacles/in$^3$. However, the FDT 160 of FIGS. 9A-9C generally defines (not including the mounting flanges or removable portion area) a width of 2.09 inches, a height of 1.35 inches, and a depth of 0.55 inches while providing 12 receptacles for subscriber optical fibers. Therefore, the FDT 160 provides a density of receptacles per unit of volume of the housing of about 7.73 receptacles/in$^3$, which is a significant improvement in density over the prior art. Various embodiments of the present invention preferably provide multi-fiber connector input FDTs having a density of receptacles per unit of volume of the housing from about 1.0 receptacles/in$^3$ to about 40 receptacles/in$^3$, more preferably a density of receptacles per unit of volume of the housing from about 5.0 receptacles/in$^3$ to about 20 receptacles/in$^3$, and still more preferably a density of receptacles per unit of volume of the housing from about 6.0 receptacles/in$^3$ to about 12 receptacles/in$^3$.

Referring now to the multi-fiber connector input FDTs of FIGS. 10A-11C, each FDT 180 and 200 are similar to the multi-fiber connector input FDT 160 of FIGS. 9A-9C but provide the input openings 182 and 202 at slightly different positions and provide eight MU fiber optic output receptacles 184 and 204 of the output openings 186 and 206 as opposed to the twelve 5 mm fiber optic output receptacles 156 (for receiving 5 mm optical connectors). The FDTS 182 and 202 also do not include mounting flanges and/or the removable portion; however, further embodiments of the present invention include FDTs that include any combination of the features described herein. The FDT 180 of FIGS. 10A-10C includes the input opening 182 in the sidewall 188 such that the input opening defines an input axis 190 generally orthogonal to the input opening 182 and the output opening 186 defines an output axis 192 generally orthogonal to the output opening, such that the input axis and the output axis are generally orthogonal to one another. The input axis 190 and the output axis 192 of the openings of the FDT 160 of FIGS. 9A-9C are also orthogonal to one another; however, the input opening of the FDT 180 of FIGS. 10A-10C has been recessed a significant amount to protect the multi-fiber connector 194 of the subscriber optical cable and to further reduce the amount of area required by the FDT and its related connectors. Similarly, the FDT 200 of FIGS. 11A-11C defines an input axis 210 and an output axis 212 that are generally parallel to one another. Therefore, the FDTs of various embodiments of the present invention provide numerous option when selecting the proper FDT to be used in a particular location, with or without particular connectors, with a particular orientation, and the like.

FIGS. 12A-14D illustrate fiber optic hardware components associated with the LCPs of various embodiments of the present invention. The fiber optic hardware components are illustrated to scale relative to similar prior art components to illustrate the differences in sizes and/or orientations achievable using microstructured optical fiber of the present invention, as described more fully below. Turning now to the fiber optic splice tray assembly 220 of FIGS. 12A-12C, the fiber optic splice tray assembly comprises a frame 224 defining a base 226 and a plurality of sidewalls 228 joined to the base, wherein a volume of the splice tray assembly is defined by a length of the base, a width of the base, and a height of the sidewalls. The splice tray assembly also includes a splice tray 230 comprising a plurality of splice holders 232 joined to the splice tray. The splice holders 232 are adapted to selectively receive a plurality of splices 234 of optical fibers 236. The splice holders 234 are generally angled relative to the sidewalls 228 of the frame 224. At least a portion of the sidewalls 228 defines slack storage generally around the splice tray 230, wherein the slack storage provides for a sufficient amount of slack of the optical fibers 236 associated with the splice generally sufficient for a technician to optically connect the optical fibers with the splice 234. As shown best in FIG. 10B, the splice tray assembly 220 provides slack storage along only two sidewalls 228 of the frame 224.

Based in part upon the use of the microstructured optical fiber described below, the splice tray assembly 220 is adapted to provide a significant improvement in the density of splices per unit of volume of the splice tray assembly, thus reducing the size, number, and/or costs of splice tray assemblies required for a particular application. Whereas prior art splice tray assemblies 236 generally define along the exterior a width of 3.94 inches, a length of 9.34 inches, and a depth of 0.4 inches while providing 24 splice holders, the splice tray assembly of the illustrated embodiment of the present invention generally defines along the exterior a width of 2.44 inches, a length of 6.34 inches, and a depth of 0.4 inches while providing 24 splice holders. Therefore, the prior art splice tray assemblies define a density of splice holders per unit of volume of the splice tray assembly of about 1.63 single splices/in$^3$ and about 3.26 mass fusion splices/in$^3$, and the splice tray assembly of the illustrated embodiment defines a density of splice holders per unit of volume of the splice tray assembly of about 3.87 single splices/in$^3$ and about 7.76 mass fusion splices/in$^3$. Various embodiments of the present invention preferably provide a density of splice holders per unit of volume of the splice tray assembly of at least 3 single splices/in$^3$ or at least 6 mass fusion splices/in$^3$, more preferably a density of splice holders per unit of volume of the splice tray assembly of at least 5 single splices/in$^3$ or at least 10 mass fusion splices/in$^3$, and still more preferably a density of splice holders per unit of volume of the splice tray assembly of at least 8 single splices/in$^3$ or at least 16 mass fusion splices/in$^3$.

Turning now to the fiber optic splitter module 240 of FIGS. 13A-13C, the splitter module optically connects at least one input optical fiber 242 and a plurality of output optical fibers 244. The splitter module comprises a housing 246 having at least one opening 248 therethrough, wherein the opening defines an opening axis 250 generally orthogonal to the opening. The splitter module also includes a splitter 252 within the housing 246, wherein the input optical fiber 242 is optically connected to the plurality of output optical fibers 244 by the splitter 252. The splitter 252 defines a splitter axis 254 generally aligned with the input optical fiber 242 and the plurality of output optical fibers 244 proximate the splitter. In the splitter module 240 of FIGS. 13A-13C, the splitter axis 254 is generally orthogonal to the opening axis 250. It should be noted that the splitter module 240 does not include a slack loop for either the input optical fiber 242 or the output optical fiber 244, based in part upon the performance of the microstructured optical fiber used in some embodiments of the present invention.

Also based in part upon the use of the microstructured optical fiber described below, the splitter module 240 is adapted to provide a significant improvement in the density of output optical fiber splits per unit of volume of the splitter module housing, thus reducing the size, number, and/or costs of splitter modules required for a particular application. Whereas prior art splitter module 256 generally defines along the exterior a width of 3.07 inches, a length of 4.85 inches, and a depth of 0.92 inches while providing 32 output fiber splits, the splice tray assembly of the illustrated embodiment of the present invention generally defines along the exterior a width of 3.47 inches, a length of 1.83 inches, and a depth of 0.83 inches while providing 32 output fiber splits. Therefore, the prior art splice tray assemblies define a density of output optical fiber splits per unit of volume of the splitter module housing of about 2.34 splits/in$^3$, and the splice tray assembly of the illustrated embodiment density of output optical fiber splits per unit of volume of the splitter module housing of about 6.07 splits/in$^3$. Various embodiments of the present invention preferably provide a density of output optical fiber splits per unit of volume of the splitter module housing of about 4 splits/in$^3$ to about 10 splits/in$^3$, more preferably a density of output optical fiber splits per unit of volume of the splitter module housing of about 5 splits/in$^3$ to about 8 splits/in$^3$, and still more preferably a density of output optical fiber splits per unit of volume of the splitter module housing of about 6 splits/in$^3$ to about 7 splits/in$^3$. It should be appreciated that the numbers given above are for 1×32 splitters and that additional splitter modules of the present invention generally define the same volume while including alternative numbers of splits, such that the amounts given above should be adjusted accordingly based upon the splitter ratio of the actual splitter(s) used in the splitter module.

Turning now to the fiber optic routing guide 260 of FIGS. 14A-14E, the fiber optic routing guide is adapted for use in an enclosure of a fiber optic network, such as the housing (and/or splitter end of the cable assembly) of an LCP as described above, to provide one non-limiting example. The routing guide 260 is adapted to store slack of an optical fiber 262, such as an optical fiber having an outer diameter of 900 μm to provide one non-limiting example. The routing guide 260 comprises a housing 264 defining an outer surface 266 generally located between a top surface 268 and a bottom surface 270. The routing guide 260 also includes a core portion 272 defining a fiber routing surface 274 along the perimeter of the core portion between the top surface 268 and the bottom surface 270. The core portion 272 is generally centered in the housing 264, and the fiber routing surface is adapted to receive the routed optical fiber 262. The routing guide 260 further includes an outer wall 276 joined to the core portion 272. The outer wall 276 defines the outer surface 266 of the housing 264 and defines an inner surface 278 opposite the outer surface and facing the fiber routing surface 274 of the core portion 272. For the routing guide 260 of FIGS. 14A-14C, the fiber routing surface 278 generally defines a plurality of curved surfaces having a common center, the outer surface 266 generally defines a plurality of curved surfaces having a common center, and the centers for both the fiber routing surface and the outer surface correspond (same center). Tab portions 280 extending radially from the fiber routing surface 274 and the inner surface 278. The volume of the routing guide 260 is defined along the outer surface 266 between the top surface 268 and the bottom surface 270.

Based in part upon the use of the microstructured optical fiber described below, the routing guide 260 of FIGS. 14A-14C is adapted to provide a significant improvement in the amount of length of optical fiber stored by the routing guide per unit of volume of the housing, thus reducing the size, number, and/or costs of routing guides required for a particular application. Whereas prior art routing guides 282 generally define an outer diameter along the outer surface of 2.50 inches and a height of 0.56 inches while being able to store 323 inches of 900 μm optical fiber, the routing guide of the illustrated embodiment of the present invention generally defines an outer diameter along the outer surface of 1.05 inches and a height of 0.56 inches while being able to store 290 inches of 900 μm optical fiber. Therefore, the prior art routing guides is adapted to store an amount of length of optical fiber per unit of volume of the housing of about 6.12 inches of 900 μm diameter optical fiber/in$^3$, and the routing guide of the illustrated embodiment is adapted to store an amount of length of optical fiber per unit of volume of the housing of about 13.1 inches of 900 μm diameter optical fiber/in$^3$. Various embodiments of the present invention preferably store an amount of length of optical fiber per unit of volume of the housing of about 10 inches of 900 μm diameter optical fiber/in$^3$ to about 20 inches of 900 μm diameter optical fiber/in$^3$, more preferably store an amount of length of optical fiber per unit of volume of the housing of about 11 inches of 900 μm diameter optical fiber/in$^3$ to about 18 inches of 900 μm diameter optical fiber/in$^3$, and still more preferably store an amount of length of optical fiber per unit of volume of the housing of about 13 inches of 900 μm diameter optical fiber/in$^3$ to about 15 inches of 900 μm diameter optical fiber/in$^3$. Still further routing guides of further embodiments of the present invention include differently shaped and/or sized routing guides adapted to hold alternative lengths of optical fibers having alternative diameters.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

Turning now to the LCP 310 of FIGS. 15-18, the LCP includes an access cover 410, similar (though not equivalent) to the access cover 110 of FIGS. 5A-5D. The access cover 410 of the LCP 310 of FIGS. 15-18 includes an interior surface 411 onto which the splitter module 398 is joined, such that the splitter module is included within the provider portion when the access cover is in the closed position, as shown in FIG. 16. The input fiber 319, which may comprise either a fiber of a distribution cable or of a drop cable, to describe two non-limiting examples of fibers being input into the LCP 310, is strain relieved with bracket 321 and routed to the splice tray assembly 360 where it is spliced to pigtail 345. The pigtail 345 is optically connected to the splitter input 322 with the splitter input adapter 347. However, further embodiments of the present invention include alternative LCPs that may not include the splice tray assembly; that include a preconnectorized connector/adapter assembly, such as the type disclosed in U.S. patent application Ser. No. 11/125,302 filed May 9, 2005 ("the '302 application"), assigned to the present assignee, the disclosure of which is incorporated by reference in its entirety herein (it should be noted that certain embodiments of the present invention do not include the electronic interface device and/or the printed circuit board of the '302 application, such that the preconnectorized end of the input optical fiber is in direct optical communication with the splitter input for the splitter module); that include a splice tray assembly without a pigtail (such that the input optical fiber is directly spliced to the splitter input); and that include alternative components, designs, and/or procedures for optically connecting the input optical fiber to the splitter input.

Still further embodiments of the present invention comprising access covers include the splitter module joined to the back wall of the housing, similar to the embodiments of FIGS. 1A-5D. Additional embodiments of the present invention comprise alternative splitter modules that include visual indicators (such as LEDs or the like) that enable a technician to visibly determine which outputs are operational without disconnecting the subscriber connections, or the like. Such embodiments with splitters having visual indicators include access covers comprising openings to view the visual indicators and/or an access cover comprising a translucent portion to enable viewing of the splitter module and/or other components of the LCP within the provider portion, to provide two non-limiting examples of alternative access covers.

The splitter module 398 of FIGS. 17 and 18 is joined to the interior surface 411 of the access cover 410 with two brackets 413, each of which is attached to the access cover with two fasteners 415. Further embodiments of the present invention, including embodiments wherein the splitter module is attached to the back wall or sidewall of the housing, include alternative devices, designs, and the like for selectively and/or permanently fastening the splitter modules to the LCP.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, 0.30%<$\Delta_1$<0.40%, and 3.0 µm<R1<5.0 µm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2-R1, and W12 is greater than 1 µm. Radius R2 is preferably greater than 5 µm, more preferably greater than 6 µm. The intermediate annular hole-containing region extends radially outward from R2 to radius R3 and has a radial width W23, equal to R3-R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A fiber optic local convergence point ("LCP"), wherein the LCP is adapted to optically connect at least one input optical fiber to a plurality of output optical fibers, the LCP comprising:
   a cover;
   a housing comprising an interior cavity defined by a back wall and a plurality of sides and by the cover that is selectively moveable relative to the housing from an opened position to a closed position to thereby provide access to the interior cavity when the cover is in the opened position, wherein the housing comprises at least one opening through the housing for the passage of the input optical fibers and the plurality of output optical fibers;
   an access cover joined to the housing and generally positioned within the interior cavity of the housing when the cover is in the closed position, wherein the access cover is selectively moveable relative to the housing from an opened position to a closed position to thereby provide access to a provider portion when the access cover is in the opened position and wherein the access cover defines an interior surface facing the back wall of the housing when the access cover defines the closed position;
   a plurality of receptacles adapted to selectively receive fiber optic connectors that are optically connected to the output optical fibers; and
   a splitter module that optically connects the input optical fiber with the plurality of receptacles, wherein the splitter module is joined to the interior surface of the access cover.

2. An LCP according to claim 1 further comprising a splice tray assembly to optically connect the input optical fiber to the splitter module.

3. An LCP according to claim 2 further comprising an splice tray adapter adapted to optically connect a pigtail from the splice tray assembly to the splitter module.

4. An LCP according to claim 1 further comprising an input adapter adapted to receive a preconnectorized end of the input optical fiber to optically connect the input optical fiber to the splitter module.

5. An LCP according to claim 1, wherein the splitter module comprises splitter outputs optically connected to the plurality of receptacles, wherein the number of splitter outputs is at least one of four, eight, sixteen, twenty-four, and thirty-two.

6. An LCP according to claim 1, wherein the splitter module is joined to the interior surface of the access cover with at least one bracket.

7. An LCP according to claim 1, wherein the splitter module is selectively joined to the interior surface of the access cover.

8. An LCP according to claim 1, wherein the splitter module is joined to the interior surface of the access cover with one or more fasteners.

9. An LCP according to claim 1 further comprising routing guides to generally route splitter outputs about the perimeter of the interior cavity from the splitter module to the plurality of receptacles.

10. A fiber optic local convergence point ("LCP"), wherein the LCP is adapted to optically connect at least one input optical fiber to a plurality of output optical fibers, the LCP comprising:

a cover;

a housing comprising an interior cavity defined by a back wall and a plurality of sides and by the cover that is selectively moveable relative to the housing from an opened position to a closed position to thereby provide access to the interior cavity when the cover is in the opened position, wherein the housing comprises at least one opening through the housing for the passage of the input optical fibers and the plurality of output optical fibers;

an access cover joined to the housing and generally positioned within the interior cavity of the housing when the cover is in the closed position, wherein the access cover is selectively moveable relative to the housing from an opened position to a closed position to thereby provide access to a provider portion when the access cover is in the opened position and wherein the access cover defines an interior surface facing the back wall of the housing when the access cover defines the closed position;

a plurality of receptacles adapted to selectively receive fiber optic connectors that are optically connected to the output optical fibers; and a splitter module that optically connects the input optical fibers with the plurality of receptacles, wherein the splitter module is joined to the back wall of the housing.

11. An LCP according to claim 10 further comprising a splice tray assembly to optically connect the input optical fiber to the splitter module.

12. An LCP according to claim 11 further comprising a splice tray adapter adapted to optically connect a pigtail from the splice tray assembly to the splitter module.

13. An LCP according to claim 10 further comprising an input adapter adapted to receive a preconnectorized end of the input optical fiber to optically connect the input optical fiber to the splitter module.

14. An LCP according to claim 13 further comprising routing guides to generally route splitter outputs about the perimeter of the interior cavity from the splitter module to the plurality of receptacles.

\* \* \* \* \*